United States Patent
Hane et al.

(10) Patent No.: US 7,649,168 B2
(45) Date of Patent: Jan. 19, 2010

(54) TRIPLE GRATING OPTICAL ENCODER AND MODIFIED TRIPLE GRATING OPTICAL ENCODER FOR DISPLACEMENT DETECTION

(75) Inventors: Jun Hane, Tokyo (JP); Eiji Yamamoto, Oume (JP); Yoshimi Kuroda, Funabashi (JP); Iwao Komazaki, Saitama (JP)

(73) Assignee: Olympus Corporation, Tokyo (JP)

( * ) Notice: Subject to any disclaimer, the term of this patent is extended or adjusted under 35 U.S.C. 154(b) by 126 days.

(21) Appl. No.: 11/900,252

(22) Filed: Sep. 11, 2007

(65) Prior Publication Data

US 2008/0251703 A1 Oct. 16, 2008

(30) Foreign Application Priority Data

Sep. 11, 2006 (JP) ............................... 2006-245339

(51) Int. Cl.
*G01D 5/34* (2006.01)
(52) U.S. Cl. ............................ 250/231.13; 250/231.14; 250/237 G
(58) Field of Classification Search ................................. 250/231.13–231.18, 237 G
See application file for complete search history.

(56) References Cited

U.S. PATENT DOCUMENTS 5,774,219 A * 6/1998 Matsuura .................... 356/499
2006/0097141 A1 * 5/2006 Kiriyama et al. ....... 250/231.13

FOREIGN PATENT DOCUMENTS

JP 6-17045 5/1994

* cited by examiner

*Primary Examiner*—Georgia Y Epps
*Assistant Examiner*—Tony Ko
(74) *Attorney, Agent, or Firm*—Scully, Scott, Murphy & Presser, P.C.

(57) ABSTRACT

In a triple slit optical encoder, a first grating and a third grating are formed on separate members, and values of a first effective width W1 and a first pitch p1 of an optical pattern on the first grating, and a third effective width W3 and a third pitch p3 of an optical pattern on the third grating are set to values such that a periodic signal having the amplitude effective for detection of a relative displacement of a scale is achieved based on periodicity of the self-image, refractive indices of substances of substances and/or spaces interposed in the optical path from a bare LED up to a photodetector, and the thickness of those substances and/or spaces in a direction substantially perpendicular to a plane on which the second grating is formed.

24 Claims, 16 Drawing Sheets

TRIPLE GRATING OPTICAL ENCODER AND MODIFIED TRIPLE GRATING OPTICAL ENCODER FOR DISPLACEMENT DETECTION

CROSS-REFERENCE TO RELATED APPLICATION

The present application is based upon and claims the benefit of priority from the prior Japanese Patent Application No. 2006-245339 filed on Sep. 11, 2006; the entire content of which are incorporated herein by reference.

BACKGROUND OF THE INVENTION

1. Field of the Invention

The present invention relates to an optical displacement sensor which is used for detection of a displacement of an encoder etc., and particularly, to an optical encoder.

2. Description of the Related Art

A general example of an optical encoder according to a conventional technology is an optical encoder called as a triple slit type optical encoder. This optical encoder includes a light source such as an LED (light emitting diode), a first grating which is disposed in an optical path of light from the light source, a second grating which is disposed on a scale which receives light from the first grating, a third grating on which a light which has passed through or reflected from the second grating is incident, and a photodetector which is disposed immediately after the third grating. Moreover, components excluding the scale that includes the second grating form a detecting head.

As a reflecting triple slit type optical encoder, an optical encoder shown in Utility Model Kokoku (Post Exam Application) No. Hei 6-17045 Publication is available. As shown in FIG. 10 and FIG. 11, a structure is such that a first grating 14 and a third grating 16 are formed on one transparent member, and height of the first grating 14 and the third grating 16 are aligned, and disposed in the detecting head. In this structure, setting is such that the distance from the first grating 14 up to a second grating 12, and the distance from the second grating 12 up to the third grating 16 become equal.

A principle of detection of the triple slit type optical encoder is as follows. Light emerged from the first grating 14 is diffracted at the second grating 12, then a magnified image of the second grating 12 is formed on the third grating 16, and light passed through the third grating 16 is detected at a photodetector 46.

The structure is designed such that the magnified image of the second grating 12, and the third grating 16 have the same pitch, and an amount of displacement due to a change in the intensity of light which is detected at a photodetector 46 according to a movement of a scale 40, is detected.

In the triple slit optical encoder, to align the heights of the first grating 14 and the third grating 15 according to a set value is an important point. This is because when the alignment of heights is disturbed even slightly different from the set value, a magnification of the image formed on the third grating 16 is changed and a signal amplitude of light detected at the photodetector 46 upon passing through the third grating 16 is decreased.

In the reflecting triple slit type optical encoder as shown in Utility Model Kokoku (Post Exam Application) No. Hei 6-17045 Publication, since the first grating 14 and the third grating 16 are formed on the same transparent member, it is possible to suppress a misalignment of heights by a few tens of μm at most. By this structure, the problem of deterioration of the detected signal amplitude is avoided.

On the other hand, the current trend of encoders shows significant progress in reduction of size and cost: the size of detecting heads which typically ranged between 10 to 20 mm has been reduced to merely a few mm wide. Furthermore, it might be possible that a cost of one piece of not more than 0.1 μm of resolution which is a few ten thousand yen will be reduced by one to two digits.

In such a situation, regarding packaging for facilitating the cost reduction, it has been considered that packaging will be shifted from conventional one in which a metal or ceramics is used, to one with cheaper materials such as resin molding.

In a conventional structure which is integrated for aligning the heights of the first grating and the third grating, mainly glass is used as a transparent material which forms the first grating and the third grating, and the thickness thereof is approximately 1 mm or more.

For reducing the size, when the thickness of the glass, which is a transparent member, is reduced to from one third to about one tenth and the glass is buried in a resin for molding, by a stress generated in stages of the resin molding, or by a residual stress after the manufacturing, defects such as a crack RC in a resin 60, and a breaking GW in the glass as shown in FIG. 13 may happen. Because of these defects, size-reduced encoder heads may cease to function as an encoder, and this may lead to a deterioration of reliability.

To solve this issue, a structure has been adopted in which, the member on which the first grating and the third grating are formed is divided into two members, and the two members are attached to other members the sizes being reduced to the minimum sizes required. Then it has become possible to solve the problems regarding reliability, such as a crack or breaking in the resin or glass. However, such a structure has caused too large dispersion in the signal amplitude of encoders, particularly, a decline of the signal level. Consequently, encoders suitable for mass production could not be realized.

(Experiments Related to the Tolerance of the Grating Positions)

Therefore, applicants of the this patent application carried out experiments to find out a relationship between $\Delta zd$ and a signal amplitude from a photodetector, on a structure shown in FIG. 14 and FIG. 15, an optical triple-slit type encoder in which the members on which the first grating and the third grating are formed are separated. The definition of $\Delta zd$ will be described later.

In FIG. 14, there is a light projecting section on a substrate 110b, and the light projecting section includes a bare-chip LED 120 as a light source, and a light transmission substrate 130 which is stacked on the bare-chip LED 120, and on which a first grating 131 is formed.

A light detecting section is provided on a substrate 110a which is separate from the substrate 110b, and the light detecting section is formed by stacking a light transmission substrate 150 on which a third grating 151 is formed on a photodetector 140. A scale 170 on which a second grating 191 is formed is disposed in parallel to a plane on which the first grating 131 and the third grating 151 are formed.

A plane parallel to the planes on which the first grating 131, the second grating 171, and the third grating 151 are formed is let to be an xy plane. An x direction is let to be a grating pitch direction of the second grating 171, a y direction is let to be a direction perpendicular to the x direction, and a z direction is let to be a direction perpendicular to the xy plane. When the scale is displaced in the x direction, since a self-image mentioned above moves on the plane on which the third grating 151 is formed, a periodic signal in a form of a quasi sine wave is obtained from the photodetector.

Here, experimental conditions are given below.

Expression 1 (will be described later): $\lambda=650$ nm, $p2=20$ μm, $k=1$

Expression 4 (will be described later): $\Delta z0=0$ mm

Effective area of first grating: 0.15 mm×0.15 mm (in FIG. 14, $W_{x,1}=W_{y,1}=0.15$ mm)

Effective area of third grating: 1.0 mm×0.5 mm (in FIG. 14, $W_{x,3}=1.0$ mm, $W_{y,3}=0.5$ mm)

According to the experiment of the applicants of this patent application, under these conditions, when $\Delta zd$ was changed, the amplitude of the periodic signal in the form of the quasi sine wave output from the photodetector was changed as in FIG. 16. According to the experiment, when p1, p3, z1, and z2 were set such that the conditions become optimum at $\Delta z0=0$, the tolerance of $\Delta zd$ for which the signal amplitude becomes ½ was ±35 μm.

On the other hand, from a manufacturing point of view, disposing by mounting a first grating 110 and a third grating 130 such that $\Delta zd$ is in a range of ±35 μm, involves a high degree of difficulty in the mass production stage. Moreover, since the dimensional tolerance of structural members become strict in the direction of thickness, the z direction, it is revealed that it is very difficult to propose an optical encoder of this type at a low cost.

When the points mentioned above are put together, the conventional optical encoders in which the first grating and the third grating are formed on one transparent member have a structure which is not suitable for low-cost packaging of the resin molding etc. from a point of reliability, when the size is reduced. When the first grating and the third grating are simply formed on separate members in order to manufacture low-cost optical encoders while securing the reliability, due to the too large dispersion of mounting accuracy of the gratings in a direction of height, it is not possible to achieve encoder signals having an even amplitude, at the time of mass production.

SUMMARY OF THE INVENTION

The present invention is made in view of the abovementioned circumstances, and the object of the present invention is to provide an encoder which has a stable performance, a high reliability, and a small size, and which is suitable for mass production at low cost.

To solve the issues mentioned above, and to achieve the object, according to the present invention there can be provided an optical encoder including a light source, a photodetector, a scale which is relatively displaceable with respect to the light source and the photodetector, a first grating which is interposed between the light source and the scale, and on which, an optical pattern of a first pitch p1 is formed in a direction of relative displacement of the scale, a second grating which is provided on the scale, and on which, an optical pattern of a second pitch p2 is formed in the direction of relative displacement of the scale, and a third grating which is interposed between the scale and the photodetector, and on which, an optical pattern of a third pitch p3 is formed in the direction of relative displacement of the scale, and light emerged from the light source travels via the first grating and the second grating, and forms an image on the third grating as a self-image in which the optical pattern formed on the second grating is magnified at a predetermined magnification, and a periodic signal according to an amount of relative displacement of the scale is detected, and the first grating and the third grating are formed on separate members, and values of a first effective width W1 and the first pitch p1 of the optical pattern of the first grating, and a third effective width W3 and the third pitch p3 of the optical pattern on the third grating are set to values such that the periodic signal having amplitude effective for detection of the relative displacement of the scale is achieved based on periodicity of the self-image, refractive indices of substances and/or spaces interposed in the optical path from the light source up to the photodetector, and the thickness of those substances and/or spaces in a direction substantially perpendicular to the plane on which the second grating is formed.

Moreover, according to the present invention, there can be provided an optical encoder including a light source, a scale which is relatively displaceable with respect to the light source and a photodetector, a first grating which is interposed between the light source and the scale, and on which, an optical pattern of a first pitch p1 is formed in a direction of relative displacement of the scale, a second grating which is provided on the scale, and on which, an optical pattern of a second pitch p2 is formed in the direction of relative displacement of the scale, and an array photodetector in which a plurality of photodetectors are formed at a third pitch p3, in the direction of relative displacement of the scale, and light emerged from the light source travels via the first grating and the second grating, and forms an image on the array photodetector, as a self-image in which the optical pattern formed on the second grating is magnified at a predetermined magnification, and a periodic signal according to an amount of relative displacement of the scale is detected, and the first grating and the array photodetector are formed on separate members, and values of a first effective width W1 and the first pitch p1 of the optical pattern on the first grating, and a third effective width W3 and the third pitch p3 of the photodetector which forms the array photodetector are set to values such that the periodic signal having amplitude effective for detection of the relative displacement of the scale is achieved based on periodicity of the self-image, refractive indices of substances and/or spaces interposed in the optical path from the light source up to the array photodetector, and the thickness of those substances and/or spaces in a direction substantially perpendicular to the plane on which the photodetector are formed.

Moreover, according to a preferable aspect of the present invention, it is desirable that total strength of the superposed signals of the self-image patterns formed on the third grating by all the individual grating windows of the first grating is reinforced due to the pitches of the first grating, the second grating and the third grating and in a range of the third effective width W3 of the third grating, the signal strength of the self-image formed on the third grating is reinforced due to the pitches of the self-image and the third grating.

Moreover, according to a preferable aspect of the present invention, it is desirable that total strength of the superposed signals of the self-image patterns formed on the array photodetector by all the individual grating windows of the first grating is reinforced due to the pitches of the first grating, the second grating, and the array photodetector, and in a range of the third effective width W3 of the array photodetector, the signal strength of the self-image is reinforced due to the pitch of the self-image and the pitch p3 of the array photodetector.

Furthermore, according to a preferable aspect of the present invention, it is desirable that when a and b are let to be integer numbers not less than 1, and the effective number of cycles of the first grating is let to be a value obtained by dividing the first effective width W1 by the first pitch p1, the absolute value of the difference between the effective number of cycles of the first grating, and the number of cycles of the self-image included per first effective width W1 on the third grating is less than 1 cycle, or within the limit whose center is (a+0.5) cycles and whose range is less than 0.5 cycle, and the absolute value of the difference between the number of cycles of the third grating per the third effective width W3, and the number of cycles of the self-image per the third effective width W3 on the third grating is less than 1 cycle, or within the limit whose center is (b+0.5) cycles and whose range is less than 0.5 cycle.

According to a preferable aspect of the present invention, it is desirable that when a and b are let to be integer numbers not less than 1, and the effective number of cycles of the first grating is let to be a value obtained by dividing the first effective width W1 by the first pitch p1, the absolute value of the difference between the effective number of cycles of the first grating, and the number of cycles of the self-image included per effective width W1 on the array photodetector is less than 1 cycle, or within the limit whose center is (a+0.5) cycles and whose range is less than 0.5 cycle, and the absolute value of the difference between the number of cycles of the (array) photodetector per the third effective width W3, or the number of cycles of the self-image per the third effective width W3 on the array photodetector is less than 1 cycle, or within the limit whose center is (b+0.5) cycles and whose range is less than 0.5 cycle.

Moreover, according to a preferable aspect of the present invention, it is desirable that the absolute value of the difference between the effective number of cycles W1/p1 of the first grating, and the number of cycles of the self-image included per first effective width W1 on the third grating is less than 1 cycle, and the absolute value of the difference between the number of cycles of the third grating per the third effective width W3, and the number of cycles of the self-image per the third effective width W3 on the third grating is less than 1 cycle.

Furthermore, according to a preferable aspect of the present invention, it is desirable that the absolute value of the difference between the effective number of cycles W1/p1 of the first grating, and the number of cycles of the self-image per first effective width W1 on the array photodetector is less than 1 cycle, and the absolute value of the difference between the number of cycles of the array photodetector per the effective width W3 of the array photodetector, and the number of cycles of the self-image per the third effective width W3 on the array photodetector is less than 1 cycle.

According to a preferable aspect of the present invention, it is desirable that when the refractive index of i-th substance or space, where i is a natural number, between the first grating and the second grating is let to be ni, and the thickness thereof is let to be ti, the refractive index of j-th substance or space, where j is a natural number, between the second grating and the third grating is let to be nj, and the thickness thereof is let to be tj, the optical distance (optical path length) between the first grating and the second grating is let to be $z1 = \Sigma ti/ni$, and the optical distance between the second grating and the third grating is defined as $z2 = \Sigma tj/nj$, then $p1 = p3 = 2 \cdot p2$, and $z1 \cong z2$, and when a is let to be a natural number not less than 1, the value of the first effective width W1 of the first grating satisfies one of the following expressions.

$$W1 < p2 \cdot \frac{(z1+z2)^2}{z2 \cdot |z1-z2|}$$

$$a \cdot p2 \cdot \frac{(z1+z2)^2}{z2 \cdot |z1-z2|} < W1 < (a+1) \cdot p2 \cdot \frac{(z1+z2)^2}{z2 \cdot |z1-z2|}$$

since $z1 \cong z2$, by rearranging the two expressions mentioned above, we get $$W1 < 2 \cdot p2 \cdot \frac{(z1+z2)}{|z1-z2|}$$

$$2 \cdot a \cdot p2 \cdot \frac{(z1+z2)}{|z1-z2|} < W1 < 2 \cdot (a+1) \cdot p2 \cdot \frac{(z1+z2)}{|z1-z2|}$$

Moreover, according to a preferable aspect of the present invention, it is preferable that when the refractive index of i-th substance or space, where i is a natural number, between the first grating and the second grating is let to be ni, and the thickness thereof is let to be ti, the refractive index of j-th substance or space, where j is a natural number, between the second grating and the third grating is let to be nj, and the thickness thereof is let to be tj, the optical distance between the first grating and the second grating is let to be $z1 = \Sigma ti/ni$, and the optical distance between the second grating and the third grating is defined as $z2 = \Sigma tj/nj$, then, $p1 = p3 = 2 \cdot p2$, and $z1 \cong z2$, and when b is let to be a natural number not smaller than 1, the value of the third effective width of the third grating satisfies one of the following two expressions.

$$W3 < 2 \cdot p2 \cdot \frac{(z1+z2)}{|z1-z2|}$$

$$2 \cdot b \cdot p2 \cdot \frac{(z1+z2)}{|z1-z2|} < W3 < 2 \cdot (b+1) \cdot p2 \cdot \frac{(z1+z2)}{|z1-z2|}$$

Furthermore, according to a preferable aspect of the present invention, it is desirable that when the refractive index of i-th substance or space, where i is a natural number, between the first grating and the second grating is let to be ni, and the thickness thereof is let to be ti, the refractive index of j-th substance or space, where j is a natural number, between the second grating and the third grating is let to be nj, and the thickness thereof is let to be tj, the optical distance between the first grating and the second grating is let to be $z1 = \Sigma ti/ni$, and the optical distance between the second grating and the third grating is defined as $z2 = \Sigma tj/nj$, then $p1=p3=2 \cdot p2$, and $z1 \cong z2$, and
the first effective width W1 of the first grating and the third effective width W3 of the third grating satisfy the following expression.

$$\sqrt{W1^2 + W3^2} < 2 \cdot p2 \cdot \frac{(z1+z2)}{|z1-z2|}$$

According to a preferable aspect of the present invention, it is desirable that when the refractive index of i-th substance or space, where i is a natural number, between the first grating and the second grating is let to be ni, and the thickness thereof is let to be ti,
the refractive index of j-th substance or space, where j is a natural number, between the second grating and the third grating is let to be nj, and the thickness thereof is let to be tj,
the optical distance between the first grating and the second grating is let to be $z1=\Sigma ti/ni$, and
the optical distance between the second grating and the third grating is defined as $z2=\Sigma tj/nj$,
then $p1=p3=2 \cdot p2$, and $z1 \cong z2$, and
the first effective width W1 of the first grating and the third effective width W3 of the third grating satisfy the following expression.

$$(W1 + W3) < 2 \cdot p2 \cdot \frac{(z1+z2)}{|z1-z2|}$$

Moreover, according to a preferable aspect of the present invention, it is desirable that when the refractive index of i-th substance or space, where i is a natural number, between the first grating and the second grating is let to be ni, and the thickness thereof is let to be ti,
the refractive index of j-th substance or space, where j is a natural number, between the second grating and the array photodetector is let to be nj, and the thickness thereof is let to be tj,
the optical distance between the first grating and the second grating is let to be $z1=\Sigma ti/ni$, and
the optical distance between the second grating and the array photodetector is defined as $z2=\Sigma tj/nj$,
then $p1=p3=2 \cdot p2$, and $z1 \cong z2$, and
when a is let to be a natural number not smaller than 1, the value of the first effective width of the first grating satisfies one of the following expressions.

$$W1 < 2 \cdot p2 \cdot \frac{(z1+z2)}{|z1-z2|}$$

$$2 \cdot a \cdot p2 \cdot \frac{(z1+z2)}{|z1-z2|} < W1 < 2 \cdot (a+1) \cdot p2 \cdot \frac{(z1+z2)}{|z1-z2|}$$

Furthermore, according to a preferable aspect of the present invention, it is desirable that when the refractive index of i-th substance or space, where i is a natural number, between the first grating and the second grating is let to be ni, and the thickness thereof is let to be ti, and
the refractive index of one of a j-th substance or space, where j is a natural number, between the second grating and the array photodetector is let to be nj, and the thickness thereof is let to be tj,
the optical distance between the first grating and the second grating is let to be $z1=\Sigma ti/ni$, and
the optical distance between the second grating and the array photodetector is defined as $z2=\Sigma tj/nj$,
then, $p1=p3=2 \cdot p2$, and $z1 \cong z2$, and
when b is let to be a natural number not smaller than 1, the value of the third effective width of the array photodetector satisfies one of the following two expressions.

$$W3 < 2 \cdot p2 \cdot \frac{(z1+z2)}{|z1-z2|}$$

$$2 \cdot b \cdot p2 \cdot \frac{(z1+z2)}{|z1-z2|} < W3 < 2 \cdot (b+1) \cdot p2 \cdot \frac{(z1+z2)}{|z1-z2|}$$

According to a preferable aspect of the present invention, it is desirable that when the refractive index of i-th substance or space, where i is a natural number, between the first grating and the second grating is let to be ni, and the thickness thereof is let to be ti,
the refractive index of j-th substance or space, where j is a natural number, between the second grating and the array photodetector is let to be nj, and the thickness thereof is let to be tj,
the optical distance between the first grating and the second grating is let to be $z1=\Sigma ti/ni$, and
the optical distance between the second grating and the array photodetector is defined as $z2=\Sigma tj/nj$,
then, $p1=p3=2 \cdot p2$, and $z1 \cong z2$, and
the first effective width W1 of the first grating and the third effective width W3 of the array photodetector satisfy the following expression.

$$\sqrt{W1^2 + W3^2} < 2 \cdot p2 \cdot \frac{(z1+z2)}{|z1-z2|}$$

Moreover, according to preferable aspect of the present invention, it is desirable that when the refractive index of i-th substance or space, where i is a natural number, between the first grating and the second grating is let to be ni, and the thickness thereof is let to be ti,
the refractive index of j-th substance or space, where j is a natural number, between the second grating and the array photodetector is let to be nj, and the thickness thereof is let to be tj,
the optical distance between the first grating and the second grating is let to be $z1=\Sigma ti/ni$, and
the optical distance between the second grating and the array photodetector is defined as $z2=\Sigma tj/nj$,
then $p1=p3=2 \cdot p2$, and $z1 \cong z2$, and
the first effective width W1 of the first grating and the third effective width W3 of the array photodetector satisfy the following expression.

$$(W1 + W3) < 2 \cdot p2 \cdot \frac{(z1+z2)}{|z1-z2|}$$

Furthermore, according to a preferable aspect of the present invention, it is desirable that the light source and the first grating are formed by a light source array.
According a preferable aspect of the present invention, it is desirable that a light transmission member having a first grating pattern area on one of an entire surface and a part thereof, is mounted on the light source.

Moreover, according a preferable aspect of the present invention, it is desirable that one of a portion of the light transmission member other than the first grating pattern area and a part thereof has a light shielding function.

Furthermore, according to a preferable aspect of the present invention, it is desirable that a first grating pattern is formed on a surface on a side of a light emitting section.

DETAILED DESCRIPTION OF THE INVENTION

Embodiments of an optical encoder according the present invention will be described below in detail by referring to the accompanying diagrams. However, the present invention is not restricted to these embodiments.

First Embodiment

Figure 1:
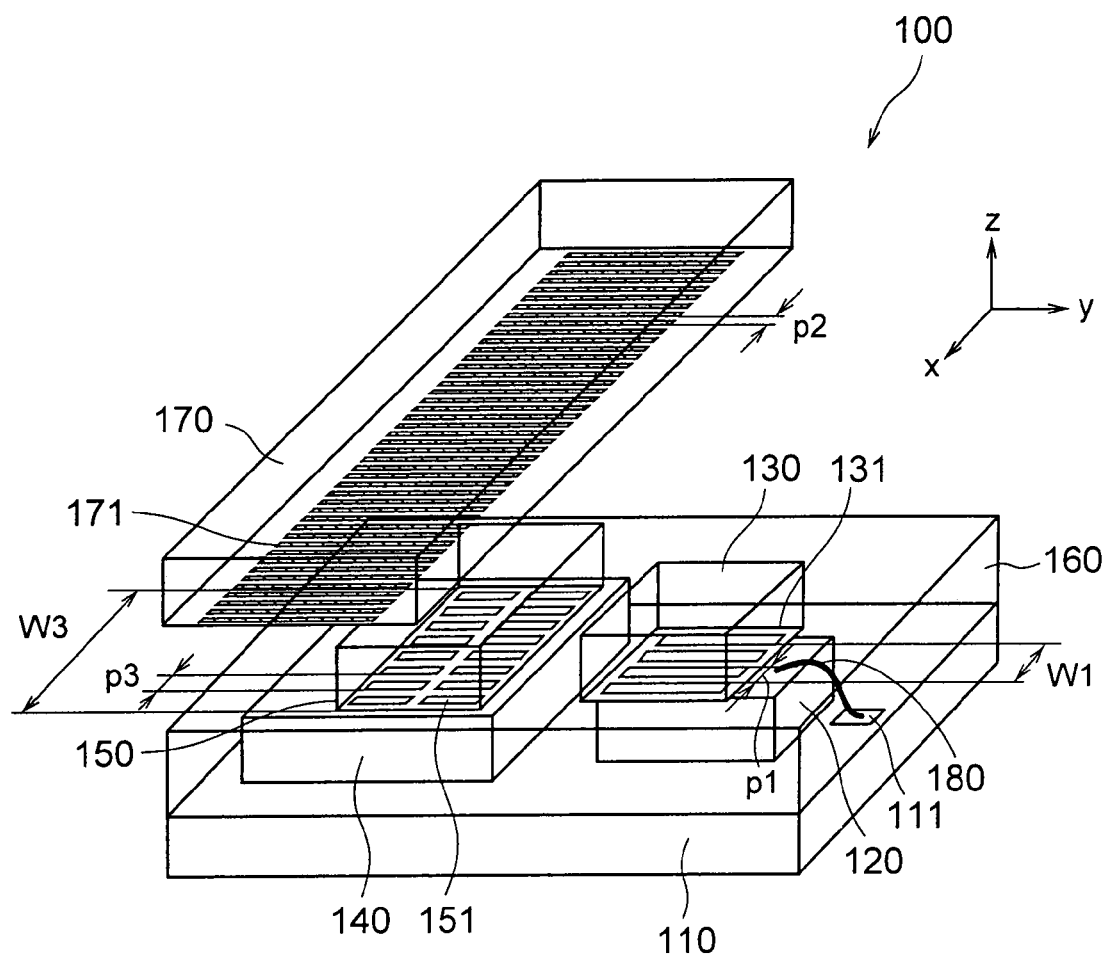
FIG. 1 is a diagram showing a perspective view of an optical encoder according to a first embodiment of the present invention.
Figure 2:
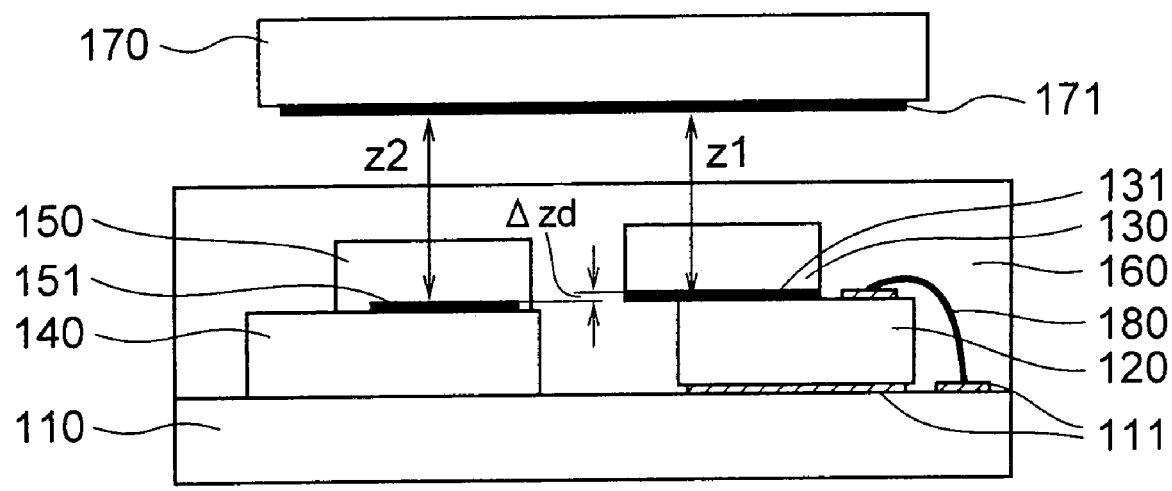
FIG. 2 is a diagram showing a cross-sectional view of the optical encoder according to the first embodiment.

An optical encoder according to a first embodiment of the present invention is shown in FIG. 1 and FIG. 2. FIG. 1 is a perspective view and FIG. 2 is a cross-sectional view. Moreover, three-axes rectangular coordinate system of x, y, and z axes as shown in the diagram, has been set.

In FIG. 1, the optical encoder includes mainly seven components namely a substrate 110, a bare LED 120 which is a bare chip, a light transmission substrate 130 having a first grating 131 of a pitch p1, a photodetector 140 having four light receiving sections, a light transmission substrate 150 having a third grating 151 of a pitch p3, a light transmitting resin 160, and a scale 170 having a second grating 171 of a pitch p2.

The substrate 110, the bare LED 120 disposed on the substrate 110, the light transmission substrate 130 disposed to be protruding in an x direction and a y direction on the bare LED 120, the photodetector 140 disposed on the substrate 110, and the light transmission substrate 150 disposed on the photodetector 140 are integrated to be formed as a detecting head, and an upper portion of the detecting head is embedded in the light transmitting resin 160 having the refractive index n.

The first grating 131, the second grating 171, and the third grating 151 are disposed to be mutually parallel, facing toward the x direction in the diagram. The top surface of the resin, at least its portion through which light from the bare LED 120 (the light source) passes when it travels towards the scale and when it travels towards the photodetector 140 after being reflected at the scale, is formed flat and in parallel to the three gratings. The scale 170 is relatively displaceable only in the x direction, in a state of the second grating 171 becoming parallel to the first grating 131 and the third grating 151.

The substrate 110, the bare LED 120, the light transmission substrate 130, the photodetector 140, and the light transmission substrate 150 are in a form of parallel flat plates. The thickness tolerance of these members is not more than about ±20 µm, and these members are directly attached on the substrate 110 one after another as shown in FIG. 2. Also regarding the dispersion in thickness of an adhesive which is used for fixing by sticking these members, the tolerance is not more than ±10 µm.

Moreover, the upper surface of the light transmitting resin 160 also has almost a flat shape. In the light transmission substrate 130, the first grating 131 is patterned on almost an entire surface on one side of the light transmission substrate 130, and is disposed such that the first grating 131 becomes a surface of the light transmission substrate 130 toward an LED side.

The effective width W1 of the first grating 131 is the width of a portion of its aperture which contributes substantially to forming the self-image on the third grating 151. Consequently, the effective width W1 of the first grating 131 does not necessarily coincide with the width of the aperture, and when the aperture is large enough, the effective width W1 becomes smaller than the width of the aperture. In this case, it is possible to find the effective width theoretically or experimentally.

In the light transmission substrate 150, the third grating 151 consists of four grating groups, each group occupying almost quarter of a surface on one side of the light transmission substrate 150. The effective width W3 of each grating group in a direction of scale movement is approximately ½ of the width of the light transmission substrate 150 in the direction of scale movement. The third grating 151 is disposed on the photodetector-side surface of the light transmission substrate 150.

Regarding electrical wiring, the bare LED 120 and the photodetector 140 are electrically connected to the substrate 110, so that the operation of the bare LED 120 and the photodetector 140 is possible. Electrodes are formed on the upper and lower surfaces of the bare LED 120. The electrode on the upper surface and an electrode on the substrate 110 are connected by an electroconductive wire 180, and the electrode on the lower surface and the electrode of the substrate 110 are connected by an electroconductive paste. There is a connection by an electroconductive wire also between the photodetector 140 and the substrate 110, but details of the connection will be omitted here. The effective width W1, the effective width W2, and the effective width W3 correspond to the first effective width, the second effective width, and the third effective width respectively. Moreover, the pitches p1, p2, and p3 correspond to the first pitch, the second pitch, and the third pitch respectively.

(Description of Principle)

A relationship between a change in the magnification of the image, and the signal amplitude of light detected by the photodetector 140 upon the light passing through the third grating 151 will be described below by using expressions.

When the optical distance between the first grating 131 and the second grating 171 is let to be z1, the optical distance between the second grating 171 and the third grating 151 is let to be z2, the pitch of the first grating 131 is let to be p1, the pitch of the second grating 171 is let to be p2, the pitch of the third grating 151 is let to be p3, and the wavelength of the light source is let to be λ, it has been known that, when the following condition is satisfied, an interference pattern having a cycle of pitch p3$i$ is formed on the third grating 151. The definition of a term 'optical distance' used here is shown in expression 14 and expression 15.

$$\frac{1}{z1} + \frac{1}{z2} = \frac{\lambda}{k \cdot p2^2} \qquad (1)$$

where k is a natural number. Moreover, the pitch p3$i$ of the interference pattern is as follows.

$$p3i = \frac{z1 + z2}{z1} \cdot p2 \qquad (2)$$

When the pitch p3 of the third grating 151 is matched with the pitch p3$i$ of the interference pattern, it is possible to perform the optimum signal detection.

$$p3 = p3i \qquad (3)$$

In a optical encoder, it is quite often that a plurality of phase-difference signals are detected. In this case, the third grating 151 might be provided for each individual phase-difference signal, or disposed by interlacing. In these situations, the pitch p3 indicates the pitch of the third grating 151 used for detection of one of the phase signals.

Incidentally, when z1 and z2 are shifted slightly from an optimum value due to a shift in mounting of the first grating 131 and the third grating 151 in the detecting head, there is a change in the magnification according to expression 2. As a result, a relationship in expression 3 does not hold true exactly, and accordingly the intensity of an interference pattern which is detected at the photodetector 140 will change.

A change in a detected signal due to a shift in z1 and z2 will be described below. As it is shown in the following expression, when the difference between the optical distance z1 from the first grating 131 to the second grating 171, and the optical distance z2 from the second grating 171 to the third grating 151 is let to be Δz, then $$\Delta z = z2 - z1 = \Delta z_0 + \Delta z_d \qquad (4) \text{ and}$$

$$|\Delta z_d| \leq \Delta z_t \qquad (5)$$

where, $\Delta z_0$ is a difference based on designing, $\Delta z_d$ is an actual deviation caused due to dispersion, and $\Delta z_t$ is the tolerance, in other words, the maximum allowance.

Figures 12A, 12B:
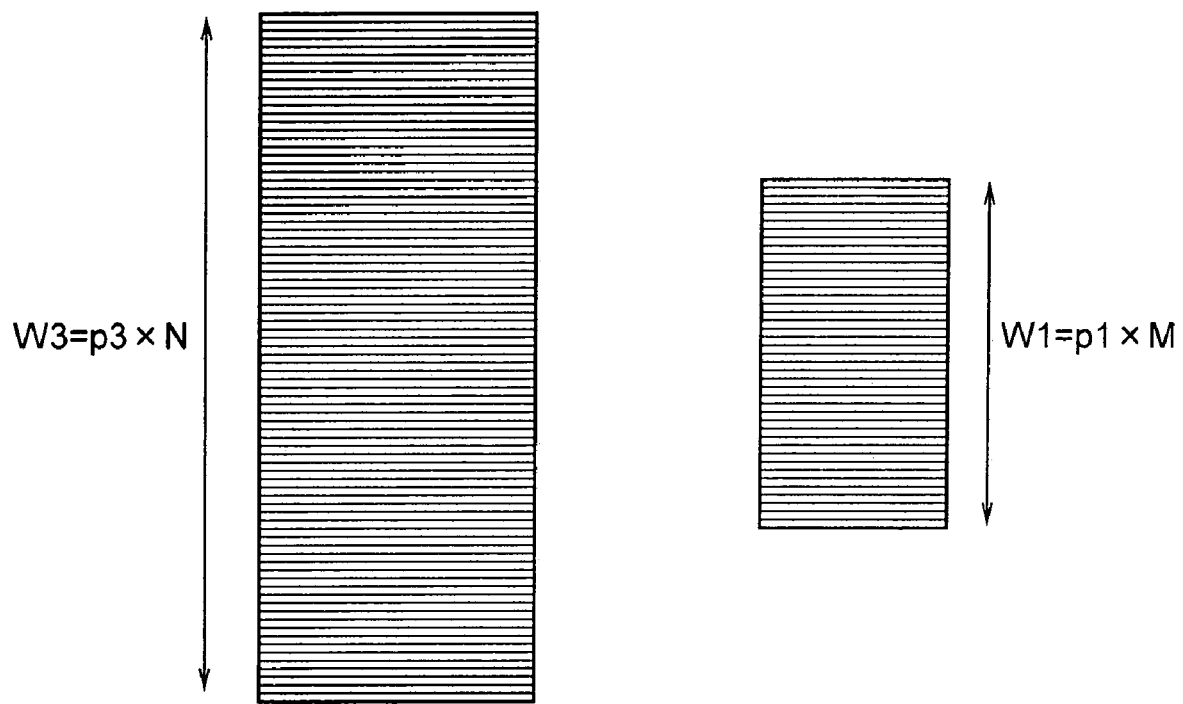
FIG. 12A and FIG. 12B are diagrams showing a structure of a first grating and a third grating.
Figure 13:
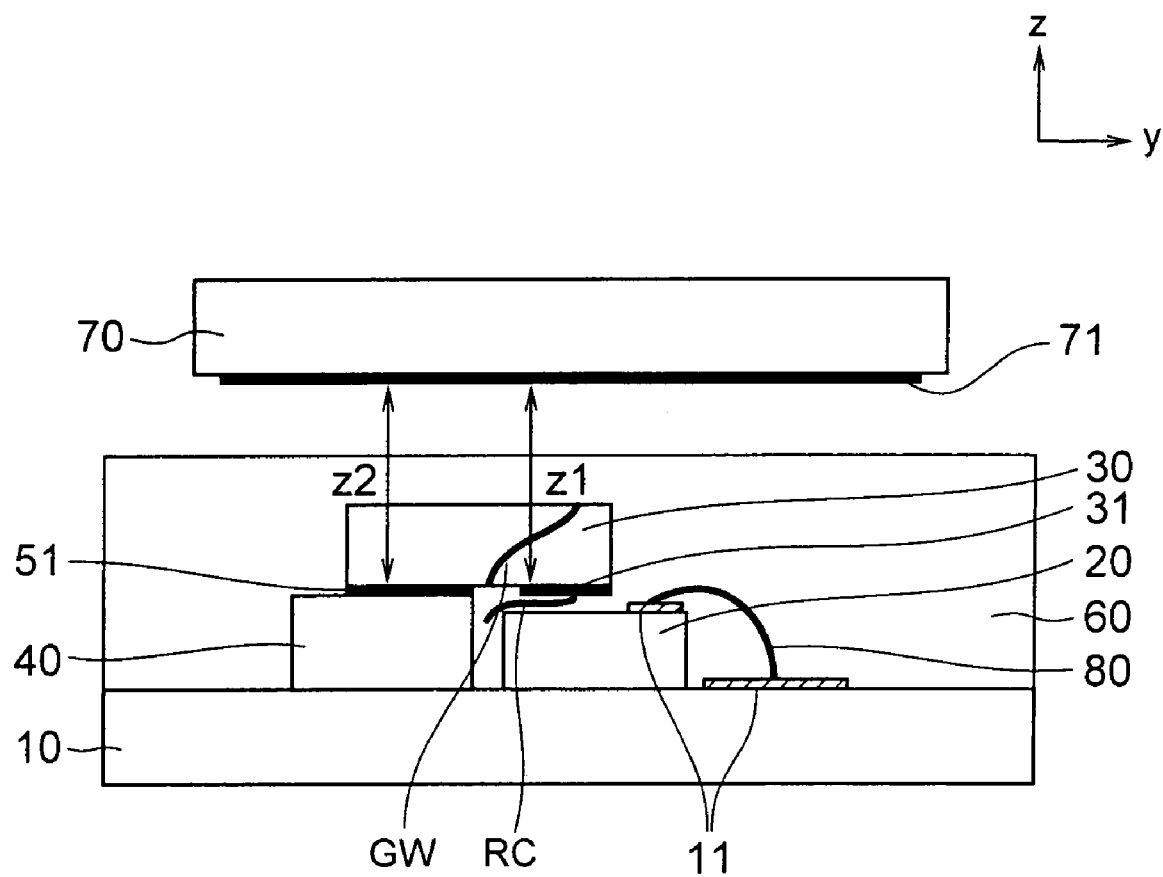
FIG. 13 is a diagram describing a crack etc.
Figure 14:
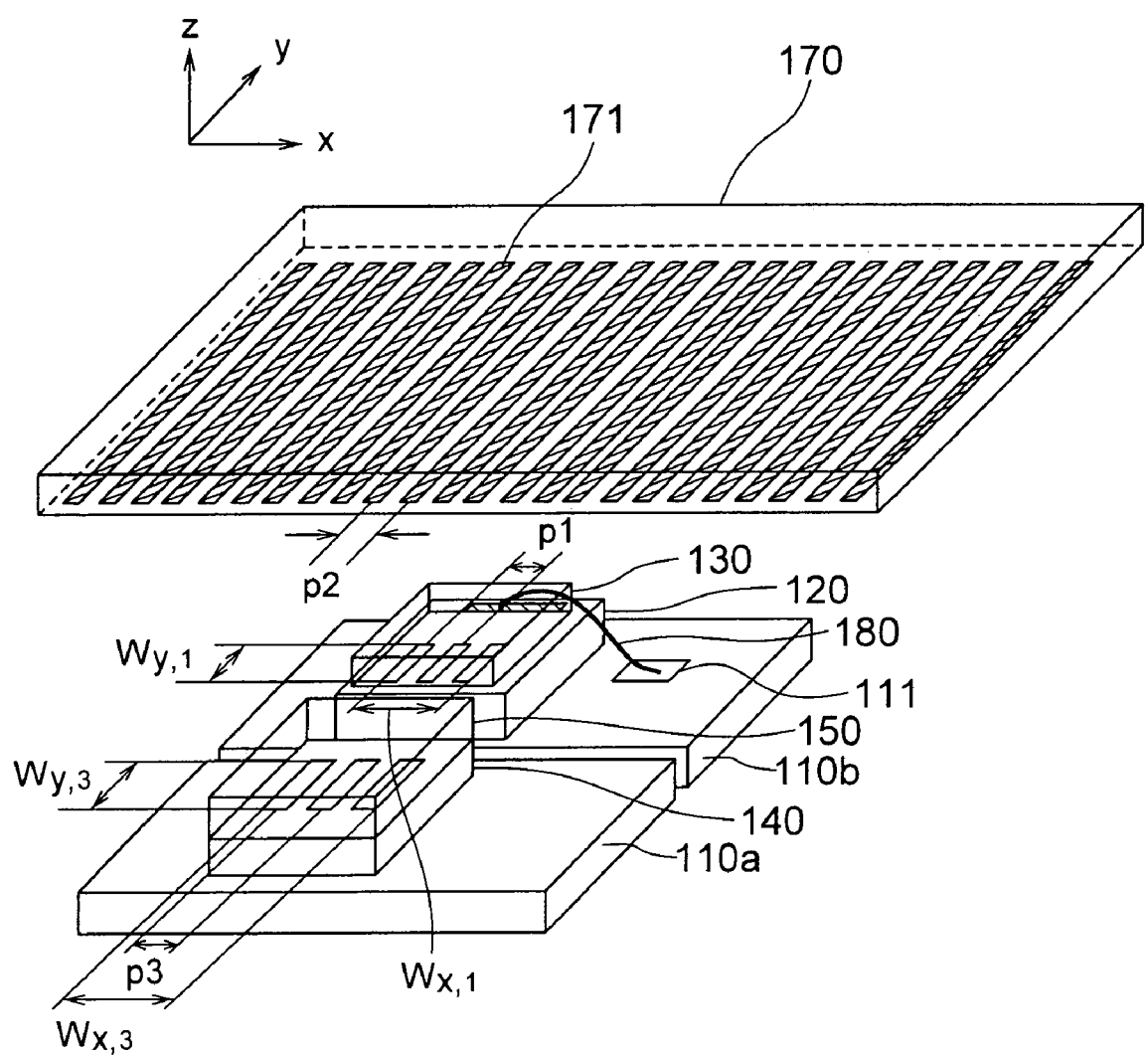
FIG. 14 is a diagram showing a perspective view of an optical encoder used for an experiment.
Figure 15:
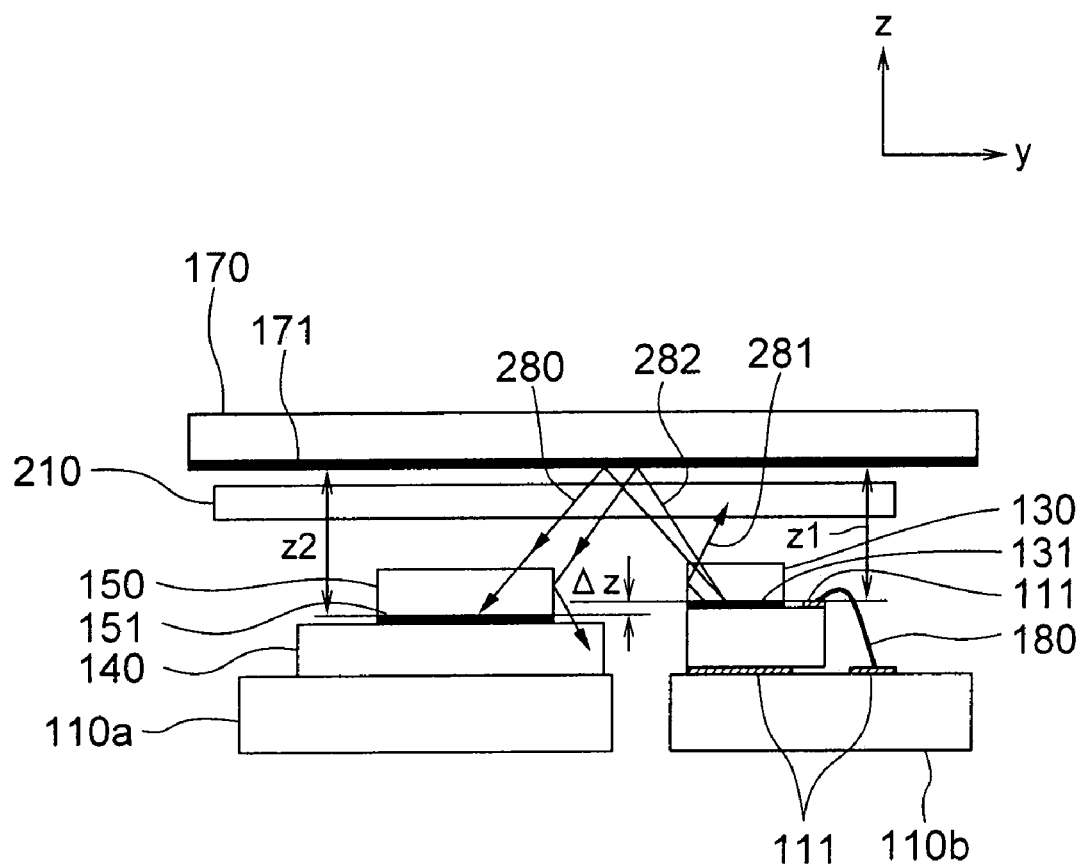
FIG. 15 is a diagram showing a cross-sectional view of the optical encoder used for the experiment.
Figure 16:
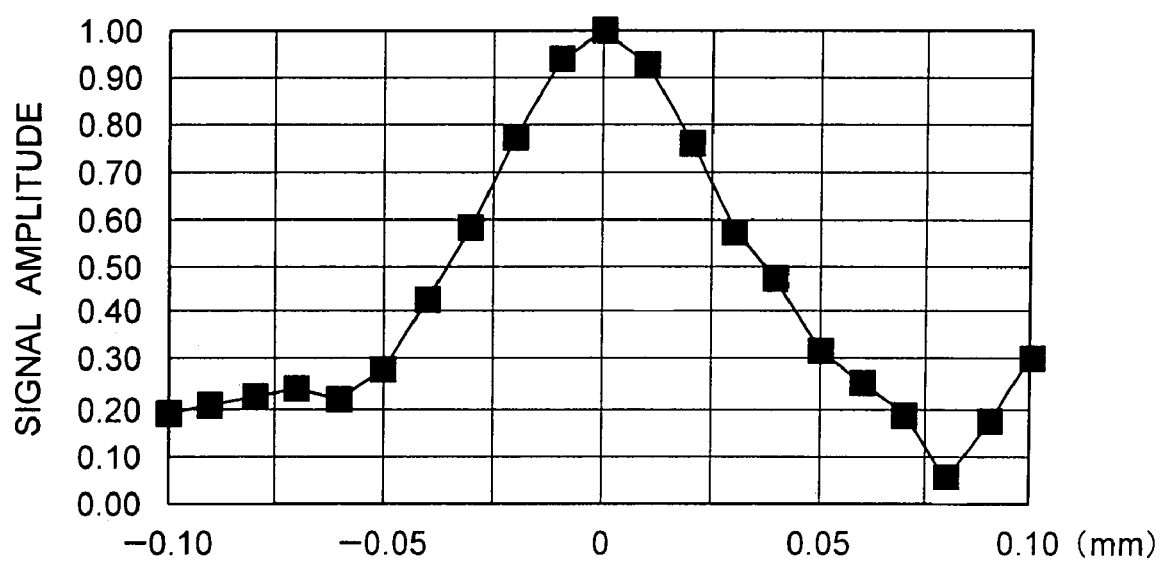
FIG. 16 is a diagram showing experiment results.

Furthermore, the first grating 131 and the third grating 151 will be regulated. As shown in FIG. 12A, the first grating 131 has M number of windows in the effective width W1 in the direction of the scale movement, at pitch p1. As shown in FIG. 12B, the third grating 151 has N number of windows in the effective width W3 in the direction of the scale movement, at pitch p3. In this case, the following expression holds true.

$$W1 = p1 \times M \qquad (6)$$

$$W3 = p3 \times N \qquad (7)$$

Here, for the reinforced amplitude of the diffraction image to be the maximum, the following condition is necessary along with the condition in expression 3.

$$p1 = p3i \qquad (8)$$

Let us assume that the pitch p3$i$ of the diffraction image has changed, and a relationship with the pitch p3 of the third grating 151 has become as follows.

$$p3i = p3 \times r \qquad (9)$$

Subsequently, let us assume that the amplitude of the interference pattern is uniform within the effective width W3, in other words, within the effective range of the light receiving section.

When a is let to be a positive integer number (integer number not less than 1), with the following condition, the amplitude becomes 0 due to a change in the magnification r.

$$r = (M \pm a)/M \qquad (10)$$

where, a is a positive integer number (integer number not less than 1).

When b is let to be a positive integer number (integer number not less than 1), with the following condition, the amplitude becomes 0 due to the change in the magnification r.

$$r = (N \pm b)/N \qquad (11)$$

where, b is a positive integer number (integer number not less than 1).

If Δzd in expression 4, the difference the optical distance between the first grating 131 and the second grating 171 and the optical distance between the second grating 171 and the third grating 151 has changed, the value of $\Delta z_d$ for which the amplitude becomes 0, can be approximated as follows by using expression 2, expression 3, expression 7, and expression 11, assuming that N is sufficiently greater than b.

$$\Delta z_d \pm b \cdot \frac{(z1 + z2)}{N} = \pm 2 \cdot b \cdot \frac{p2}{W3}(z1 + z2) \qquad (12)$$

On the other hand, $\Delta z_d$ at which the amplitude becomes 0 due to the change of the number M of the first grating 131 caused by a change in the magnification m, can be similarly approximated as follows by using expression 2, expression 3, expression 6, and expression 7, assuming that N is sufficiently greater than b.

$$\Delta z_d = \pm a \cdot \frac{(z1 + z2)}{M} = \pm 2 \cdot a \cdot \frac{p2}{W1} \cdot (z1 + z2) \qquad (13)$$

Next, the meaning of expression 12 and expression 13 will be described below. If the optical distance z1 from the first grating 131 up to the second grating 171, and the optical distance z2 from the second grating 171 up to the third grating 151, shift slightly from the optimum value, there will be a change in the magnification of the self-image of the second grating 171 formed on the third grating 151. Therefore, the intensity of the interference pattern detected by the photodetector 140 is changed.

The magnified self-images of the second grating 171, which are formed on the third grating 151 through each grating window of the first grating 131, are superimposed. Expression 12 indicates a condition for the signal amplitude to become 0 when the light and dark patterns of light cancel out due to the change in the magnification.

The magnified self-image of the second grating 171 formed on the third grating 151 is detected by the photodetector 140 through the third grating 151. Similarly, expression 13 indicates a condition for the amplitude of the detected signal to become 0 when a difference occurs between the pitch of the third grating 151 and the pitch of the magnified self-image due to the change in the magnification.

The distances which are mentioned here are all optical distances. When all optical paths are atmospheric, the actual distances may be used as optical distances, but normally, the detecting heads are put in a package in many cases, and light may pass through a glass or a light transmitting resin. In this case, the optical distance is a sum of values obtained by dividing an actual length for each space or substance forming the optical path by an individual refractive index.

In other words, when the refractive index of i-th substance or space, where i is a natural number, between the first grating 131 and the second grating 171 is let to be ni, and the thickness thereof is let to be ti, the refractive index of a j-th substance or space, where j is a natural number, between the second grating 171 and the third grating 151 is let to be nj, and the thickness thereof is let to be tj, the optical distance between the first grating 131 and the second grating 171 is let to be $\Sigma ti/ni$, and the optical distance between the second grating 171 and the third grating 151 is let to be $\Sigma tj/nj$, the following expressions hold true.

$$z1 = \sum_i \frac{ti}{ni} \quad (14)$$

$$z2 = \sum_j \frac{tj}{nj} \quad (15)$$

Consequently, in expression 12 and expression 13, in order to express as the actual distance instead of as the optical distance, by letting the refractive index of a space or a member whose thickness changes between the first grating 131 and the second grating 171 when the height of the first grating 131 changes to be n, $\Delta z_d$ obtained by expression 12 or expression 13 is to be multiplied by n.

Here, the thickness and the refractive indices of spaces or materials interposed between the first grating 131 and the second grating 171, and between the second grating 171 and the third grating 151 will be described.

Between the first grating 131 and the second grating 171, the refractive index and the thickness of the light transmission substrate 130 are n1 and t1 respectively, the refractive index and the thickness of the light transmitting resin 160 are n2 and t2 respectively, and the refractive index and the thickness of air between the detecting head and the scale 170 are n3 and t3 respectively.

Between the second grating 171 and the third grating 151, the refractive index and the thickness of air between the detecting head and the scale 170 are n3 and t3 respectively, the refractive index and the thickness of the light transmitting resin 160 are n2 and t5 respectively, and the refractive index and the thickness of the light transmission substrate 150 are n1 and t4 respectively.

Since a common material is used for the light transmission substrate 130 and the light transmission substrate 150, the refractive indices are approximately 1.5, the refractive index of the light transmitting resin 160 is approximately 1.5, and the refractive index of air is almost 1. The refractive indices of the light transmission substrate 130, the light transmission substrate 150, and the light transmitting resin 160 are chosen from those of materials which are comparatively easy to obtain. However, other values may be used, or different materials may be used for the light transmission substrate 130 and the light transmission substrate 150 so that there may be a difference in the refractive indices of the two.

In the abovementioned setting, z1 and z2 are expressed as follows.

$z1 = t1/n1 + t2/n2 + t3/n3$ $z2 = t4/n1 + t5/n2 + t3/n3$

Here, the effective widths of the first grating 131 and the third grating 151 will be described. Both indicate a width contributing to signal detection of the optical encoder. The effective light emission width of a light source has a great influence over the effective width of the first grating. In a structure of a normal optical encoder, in many cases, the optical distance from the light source up to the first grating 131 is sufficiently smaller as compared to the optical distance from the light source up to the third grating 151 via the first grating 131 and the second grating 171.

Judging from the width of light emerged from a light emitting section up to a light receiving section, in this case, the effective width of the first grating 131 roughly matches with the effective width of the light source. Moreover, when the optical distance from the light source up to the first grating 131 cannot be ignored, it is necessary to determine the effective width of the first grating 131 according to a ratio of the optical distance from the light source up to the first grating 131 to the optical distance from the light source up to the third grating 151 via the first grating 131 and the second grating 171, and the effective width of the third grating 151.

The effective width of the third grating 151 is required to be determined according to the effective width of the self-image of the second scale which is magnified on the third grating 151, the detection width of a photodetecting section, and the width of the third grating 151 on which the self-image is formed. For a broad light such as light from a normal LED chip, the detection width of the photodetecting section may be let to be the effective width of the third grating 151. Conversely, in a case of a laser light source with narrow beam width, and a light source in which the beam width is suppressed by a lens, the effective width of the self-image may be let to be the effective width of the third grating 151. Moreover, when the width of the third grating 151 on which the self-image is formed is smaller than the detection width of the photodetecting section or the effective width of the self-image, the width of the third grating 151 on which the self-image is formed may be let to be the effective width.

It may be sufficient to confirm that the effective widths satisfy expression 16 and expression 18. Consequently, when accurate values of the widths cannot be obtained, expression 16 and expression 18 may be let to be satisfied by using round numbers equal to or greater than the actual values of the effective widths.

The following relationship holds true for the pitches of the gratings, according to expression 2, expression 3, and expression 8.

$$p1 = p3 = 2 \times p2$$

The optical distances z1 and z2 between the gratings are calculated by using expression 14 and expression 15. Among the components of $\Delta z$ in expression 4, the design value of $\Delta z0$ is 0, and only $\Delta zd$ in the diagram exists. As mentioned before, $\Delta zd$ is not a geometrical difference between the first grating 131 and the third grating 151, but is a difference between z1 and z2, which are the optical distances.

The third grating 151 includes four grating groups. Each grating group has a pitch p3, and is disposed such that the phase of each grating group differs by p3/4. Four light receiving sections, which are not shown in the diagram, are formed in the photodetector 140. Each light receiving section is formed on the surface corresponding to each grating group of the third grating 151.

The shape of the first grating 131 and the shape of each individual grating group of the third grating 151 are as shown in FIG. 12A and FIG. 12B. W1 and W3 are related by a relationship W1<W3. In the first embodiment, p2, z1, z2, W1, and W3 are set such that the following relationship holds true.

$$(W1 + W3) < 2 \cdot p2 \cdot \frac{(z1 + z2)}{|z1 - z2|} \tag{16}$$

On the other hand, the following expression holds true, as a sum of lengths of two sides making a right angle in a right-angled triangle is longer than length of a hypotenuse of the right-angled triangle.

$$\sqrt{W1^2 + W3^2} < W1 + W3 \tag{17}$$

Consequently, the following expression also holds true.

$$\sqrt{W1^2 + W3^2} < 2 \cdot p2 \cdot \frac{(z1 + z2)}{|z1 - z2|} \tag{18}$$

For each component of the first embodiment of the present invention, various modifications and substitutions are possible. An example of a bare LED was shown for the light source. However, the light source may be a surface emitting laser etc., which is capable of forming a diffraction image. Glass is common as a material of the light transmission substrate 130 having the first grating 131, but a resin such as PET (polyethylene terephthalate) and polyimide may also be used. An example in which, light receiving sections are used individually for four grating groups having different detection phase in the third grating 151 is shown, but it may be a type in which one or two grating groups are used.

The structure of the first embodiment is a structure which detects an amount of relative movement. However, it is also possible to dispose additional members for detecting a reference position, particularly, a light source, a detecting section, and an optical pattern etc. Furthermore, by disposing the first grating 131, the second grating 171, and the third grating 151 or some of these three gratings in plurality, it is possible to make a structure in which a displacement in the same direction is detected by a plurality of detecting systems, or a displacement in a plurality of directions which are orthogonal is detected simultaneously.

(Effect)

Light is emerged from the bare LED 120 which is a light source, and this light is irradiated to the second diffraction grating 171 on the scale 170, after passing through the first grating 131 formed on the light transmission substrate 130. Further, the light is reflected and diffracted at the second grating 171, and a diffraction image of the second grating 171 is formed on the third grating 151 formed on the light transmission substrate 150.

This diffraction image is an image in which the second grating 171 is magnified to double size, and light of the diffraction image passed through the third grating 151 is detected at the receiving section of the photodetector 140. When the scale 170 moves relatively in the x direction with respect to the detecting head, this diffraction image moves in the x direction on the third grating 151. Therefore, a periodic quasi sine wave signal is obtained from the photodetector 140.

Four signals having a phase difference of 90° are obtained from the photodetector 140. It is possible to achieve two signals having a phase difference of 90° by taking the differences of two pairs of signals having a phase difference of 180°, if necessary. It is revealed that the following expression holds true in this case.

$$W1 < W3 < \sqrt{W1^2 + W3^2} < W1 + W3 \tag{19}$$

Consequently, from expression 16 and expression 19, the following two expressions are established.

$$W1 < 2 \cdot p2 \cdot \frac{(z1 + z2)}{|z1 - z2|} \tag{20}$$

$$W3 < 2 \cdot p2 \cdot \frac{(z1 + z2)}{|z1 - z2|} \tag{21}$$

Since expression 20 and expression 21 are established, and both W1 and W3 are positive numbers, it is revealed that the following two expressions, expression 22 and expression 23 cannot be established. Here, a is a positive integer number (integer number not less than 1), and b is a positive integer number (integer number not less than 1).

$$W1 = 2 \cdot a \cdot p2 \cdot \frac{(z1 + z2)}{|z1 - z2|} \tag{22}$$

$$W3 = 2 \cdot b \cdot p2 \cdot \frac{(z1 + z2)}{|z1 - z2|} \tag{23}$$

Since $\Delta z_d$ is (z1−z2), it is evident that expression 22 and expression 23 are equivalent to expression 13 and expression 12 respectively. Consequently, it is revealed that by a shift in magnification due to shift of $\Delta z_d$ from 0, the number of cycles of the self-image of the scale per the effective width w3 on the third grating 151 will not be shifted by even 1 cycle.

Similarly, it is also revealed that by the shift in the magnification due to shift of $\Delta z_d$ from 0, the self-images of the scale, which are formed by light emerged from between the grating grids, namely the grating windows, of the first grating 131, cannot cancel out when superposed.

Since the parameters are designed in a range in which the amplitude of the optical encoder signal does not become 0, it is possible to obtain assuredly the optical encoder signal, irrespective of manufacturing dispersion namely a change in $\Delta z_d$. Particularly, when the value of p2 which determines resolution and accuracy is fixed, by reducing the values of the effective widths W1 and W3, it is possible to have a large tolerance of $\Delta z_d$, mounting dispersion, and the manufacturing becomes easy, and a yield is improved.

On the other hand, with the substrate 110 as a common substrate, the bare LED 120, the light transmission substrate 130 having the first grating 131, the photodetector 140, and the light transmission substrate 150 having the third grating 151 are stuck directly on the substrate 110.

These members are of bare chip type having a small thickness tolerance, and a parallel flat shape, and only the thickness tolerance of the bare LED 120 and the photodetector 140, and the dispersion in thickness of a joining portion affect the mounting tolerance of Δzd. Normally, the thickness tolerance of a bare chip component is about ±20 µm at the most, and the structure is such that it is capable of suppressing the mounting tolerance to be small. Therefore, it is possible to have large effective widths W1 and W3 and have large encoder signals, and the SN ratio can be improved.

By providing a condition shown in expression 16, it is possible to satisfy four conditions of expression 20 to expression 23 with one expression. Besides, the left-hand side of the expression (W1+W3) is expressed by a sum of two variables, and it is easy to apply.

When a condition shown in expression 18 is provided instead of the condition shown in expression 16, it is possible to satisfy similarly four conditions of expression 20 to expression 23 with one expression. Besides, the left-hand side is a value close to W1 or W3 as compared to (W1+W3), and close to conditions in expression 20 and expression 21, in other words, it is possible to have a wider range as a solution, while satisfying the conditions.

In the first embodiment, W1<W3, and when W1<<W3 with the light source being extremely small, only expression 21 is to be satisfied, but when W1>W3, in other words, even in a case where the light receiving section is smaller as compared to the light emitting section, by satisfying expression 16 or expression 18, the effect of the first embodiment can be expected.

Moreover, since the first grating 131 and the third grating 151 are disposed to be on the lower side of the light transmission substrate 130 and the light transmission substrate 150, the thickness tolerance of the light transmission substrate 130 and the light transmission substrate 150 does not have an effect on the mounting tolerance of Δzd, and therefore, it is possible to suppress the mounting tolerance of Δzd to be even smaller.

By attaching the light transmission substrate 130 directly on a light emerging portion on the upper surface of the bare LED 120 which is a light source, and further carrying out wiring for conducting electricity to a portion on the upper surface of the bare LED 120, where the light transmission substrate 130 is not stuck, the function of the first grating 131 and the function of applying an electric current to the bare LED 120 are realized with a compact structure.

By using bare chip components in the light source and the light receiving section, it is possible to reduce the mounting area and thickness. Further, by using the bare LED 120, it is possible to reduce the length of the light emerging portion of the light emitting section to about few tens of µm to few hundreds of µm. It is also possible to reduce the area of the light transmission substrate 130 which is disposed thereon. Therefore, it is advantageous for a size reduction and thinning.

By bringing the first grating 131 to be in a close contact with the small light emitting section of the bare LED 120, it is possible to suppress the number of the first gratings 131 required, to be the minimum. Accordingly, it is possible to reduce the length of W1, and to have a large mounting tolerance of Δzd, or there is a merit that deterioration of the signal amplitude of the optical encoder can be suppressed to be small even with the same mounting tolerance of Δzd.

Moreover, in resin molding by size reduction and thinning, an improvement in reliability such as eliminating cracks and wire break, can be expected. Further, since it is molded by resin, atmospheric pressure does not have an effect on the encoder easily, and it is possible to use the encoder in vacuum or under high pressure.

In the first embodiment, p2, z1, z2, W1, and W3 are set such that expression 16 is established. However, there is a structure capable of signal detection even in cases other than this. An example will be described below. Expression 13 and expression 12 are conditions for the signal amplitude to become 0. Δzd is equal to z2−z1 (Δzd=(z2−z1)). In this case, when expression 13 is modified (transformed), it becomes as follows. Here, a is a positive integer number.

$$W1 = 2 \cdot a \cdot p2 \cdot \frac{(z1+z2)}{|z1-z2|} \tag{24}$$

A case in which certain specific integer numbers M and (M+1) are applied for a will be considered. In this case, the signal amplitude becomes 0 with a=M and a=(M+1), but with a value of a between these M and (M+1), the signal amplitude does not become 0. Consequently, a condition under which the signal amplitude does not become 0 is 1) or 2) given below.

1) when $0 \leqq a \leqq 1$ in expression 24, or in other words, when the condition in expression 20 holds true.

2)

$$2 \cdot a \cdot p2 \cdot \frac{(z1+z2)}{|z1-z2|} < W1 < 2 \cdot (a+1) \cdot p2 \cdot \frac{(z1+z2)}{|z1-z2|} \tag{25}$$

where, a is a positive integer number.

Similarly, when expression 12 is transformed, the following equation is obtained.

$$W3 = 2 \cdot b \cdot p2 \cdot \frac{(z1+z2)}{|z1-z2|} \tag{26}$$

where, b is a positive integer number.

A case in which certain specific integer numbers N and (N+1) are applied for b will be considered. In this case, the signal amplitude becomes 0 with b=N and b=(N+1), but with a value of b between these N and (N+1), the signal amplitude does not become 0. Consequently, a condition under which the signal amplitude does not become 0 is 3) or 4) given below.

3) when $0 \leqq b < 1$ in expression 26, or in other words, when the condition in expression 21 holds true.

4)

$$2 \cdot b \cdot p2 \cdot \frac{(z1+z2)}{|z1-z2|} < W3 < 2 \cdot (b+1) \cdot p2 \cdot \frac{(z1+z2)}{|z1-z2|} \quad (27)$$

where, b is a positive integer number.

When the points mentioned above are put together, a content of expression 13 corresponds to expression 20 and expression 25, and a content of expression 12 corresponds to expression 21 and expression 27. In a structure which satisfies expression 16 of the first embodiment, expression 20 and expression 21 are satisfied simultaneously. Consequently, the structures in which the signal detection is possible in a case where expression 16 does not hold true, satisfy one of the following three combinations of expressions.

(1) Expression 20 and expression 27

(2) Expression 25 and expression 21

(3) Expression 25 and expression 27

As an effect of these structures, the signal detection of the optical encoder becomes possible even by adopting these structures. Moreover, the designing is possible even when z1 is not necessarily equal to z2, and the degree of freedom of designing is improved.

Modified Embodiment

Figure 3:
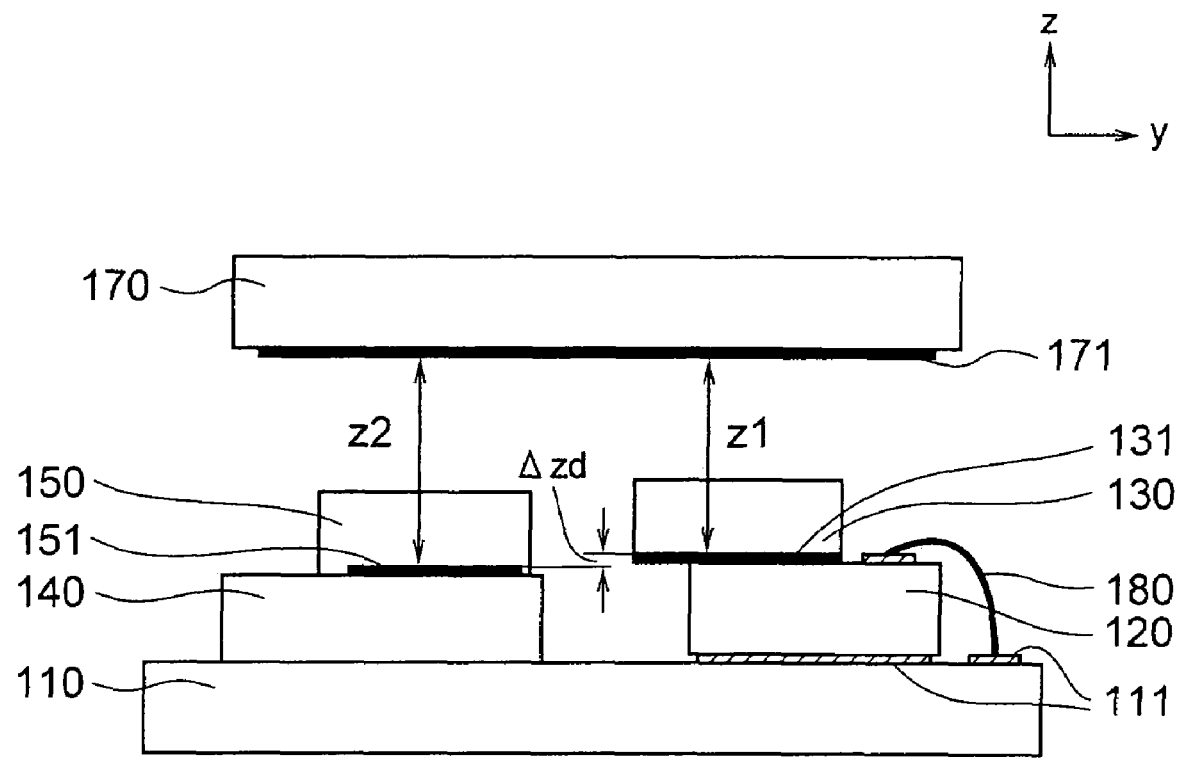
FIG. 3 is a diagram showing a cross-sectional view of an optical encoder according to a modified embodiment of the first embodiment.

A modified embodiment of the first embodiment of the present invention is shown in FIG. 3. FIG. 3 is a cross-sectional view. As shown in the diagram, a coordinate system of x y z is set.

This modified embodiment is an embodiment in which the light transmitting resin 160 is excluded from the first embodiment. From an aspect of physical and electrical reliability, only the wiring portion may be protected by resin potting etc. Moreover, the entire head section may be put in a case made of ceramic etc., and may be sealed with a lid.

In this modified embodiment, similarly as in the first embodiment, p2, z1, z2, n, W1, and W3 are set such that expression 16 to expression 18 are satisfied. However, in this case, refractive indices n corresponding to resin, are all replaced by n=1. The thickness of each member is to be set such that z1 and z2 which are calculated by applying expression 14 and expression 15 to this modified embodiment become almost equal.

In this modified embodiment, basically, the functions of the members are the same as those of the first embodiment, and the relationships in expression 20 and expression 21 hold true.

In this modified embodiment, similar effects as in the first embodiment are achieved. As an effect peculiar to this modified embodiment, the use and preservation at a temperature higher than or equal to an upper temperature limit of the resin can be cited since the encoder head is not molded by resin. Moreover, since the head size is small, and the members and the manufacturing process are simplified, the cost can be also reduced.

Second Embodiment

Figure 4:
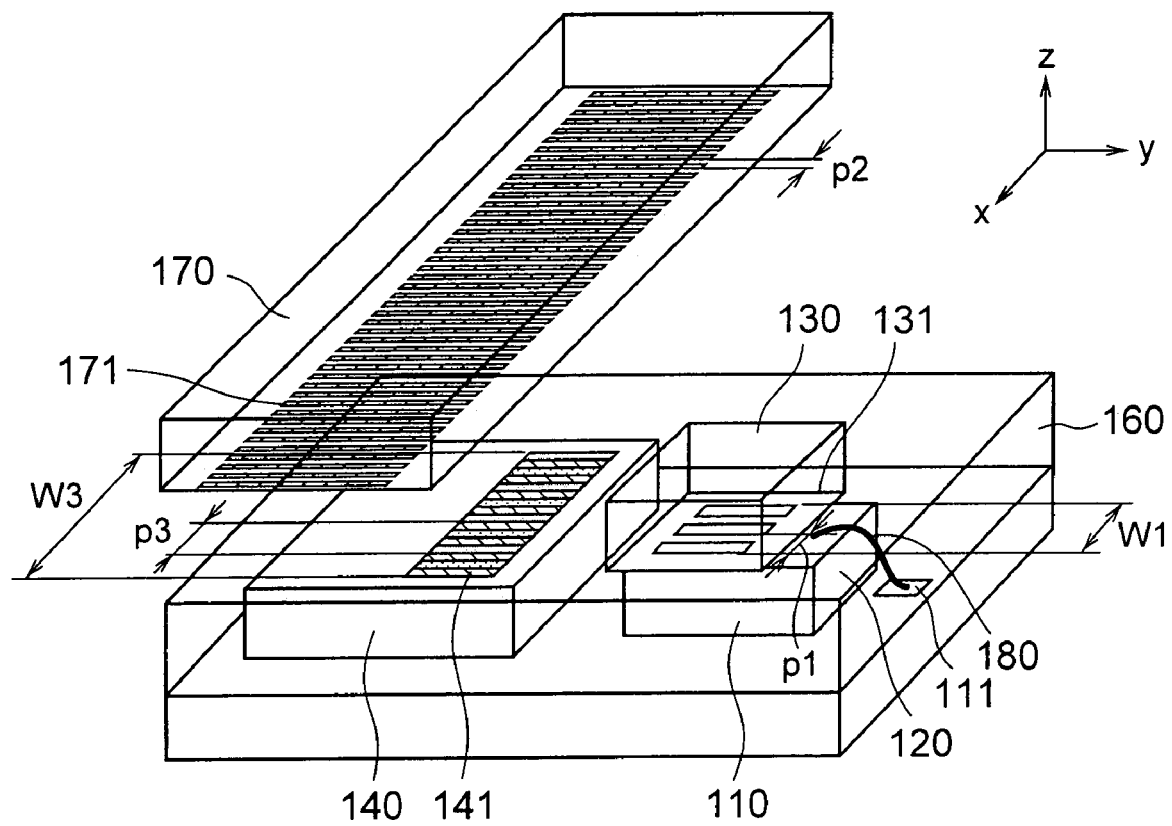
FIG. 4 is a diagram showing a perspective view of an optical encoder according to a second embodiment of the present invention.
Figure 5:
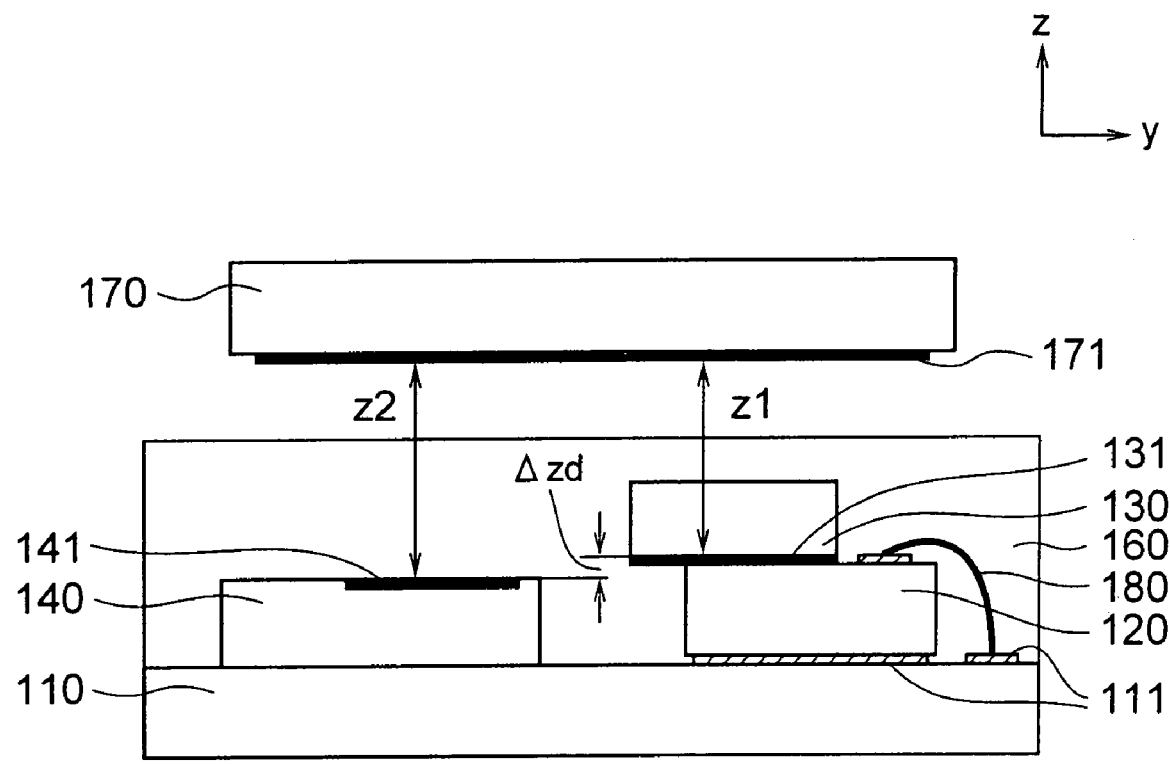
FIG. 5 is a diagram showing a cross-sectional view of the optical encoder according to the second embodiment.

Next, a second embodiment of the present invention will be described below by referring to FIG. 4 and FIG. 5. A photodetector, which includes a PD (photodiode) array in which the third grating 151 and the light receiving section are integrated, is included as a component. FIG. 4 is a perspective view and FIG. 5 is a cross-sectional view. Moreover, as shown in the diagram the coordinate system of x y z is set.

In FIG. 4, an optical encoder includes mainly six components namely the substrate 110, the bare LED 120 which is a bare chip, the light transmission substrate 130 having the first grating 131 of the pitch p1, a photodetector 140 having a photodiode array 141 (hereinafter, called appropriately as 'PD array') of the pitch p3, the light transmitting resin 160, and the scale 170 having the second grating 171 of the pitch p2.

The substrate 110, the bare LED 120 disposed on the substrate 110, the light transmission substrate 130 disposed to be protruding in the x direction and the y direction on the bare LED 120, and the photodetector 140 disposed on the substrate 110 are integrated to be formed as the detecting head. The upper portion of the detecting head is embedded in the light transmitting resin 160 having the refractive index n.

The first grating 131, the second grating 171, and a light receiving surface of the PD array 141 are disposed to be mutually parallel facing toward the x direction in the diagram. The top surface of the resin, at least its portion through which the light from the light source passes when it travels towards the scale and when it travels towards the PD array 141 after being reflected at the scale, is formed flat and in parallel to the three gratings. The scale 170 is relatively displaceable only in the x direction, in a state of the second grating 171 becoming parallel to the first grating 131 and the PD array 141.

The substrate 110, the bare LED 120, the light transmission substrate 130, and the photodetector 140 are in the form of parallel flat plates. The thickness tolerance of these members is not more than about ±20 µm, and these members are directly attached on the substrate 110 one after another as shown in FIG. 4 and FIG. 5. Also regarding the dispersion in thickness of an adhesive which is used for fixing by sticking these members, the tolerance is not more than ±10 µm. Moreover, the upper surface of the light transmitting resin 160 also has an almost flat shape.

In the light transmission substrate 130, the first grating 131 is patterned on a central portion of a surface on one side of the light transmission substrate 130, and a surrounding portion is let to be a light shielding portion, thereby not allowing the light to pass through. The light transmission substrate 130 is disposed such that the first grating 131 becomes a surface of the light transmission substrate 130 toward the LED side.

Similarly, in the photodetector 140, the PD array 141 is formed on the upper surface of the photodetector 140, toward a scale side, and occupies a partial area of the photodetector 140. Moreover, receiving sections of the same shape are arranged at a pitch p3/4. Signals of four different phases are generated, in which the phase is shifted by p3/4 by connecting electrically for each of the four phases. A pitch of each phase group is p3 for all phase groups, and the effective width W3 in the direction of scale movement is equal to a length of the PD array 141.

PD array 141 is an array in which the photodetector 140 and the third grating 151 are integrated, and a function of the triple slit described in the conventional technology holds true as it is. Regarding an electrical wiring, the bare LED 120 and the photodetector 140 are electrically connected to the substrate 110, thereby making the operation of the bare LED 120 and the photodetector 140 possible. Electrodes are formed on the upper and lower surfaces of the bare LED 120. The electrode on the upper surface and the electrode on the substrate 110 are connected by the electroconductive wire 180, and the electrode on the lower surface and the electrode of the substrate 110 are connected by the electroconductive paste. There is a connection by an electroconductive wire also between the photodetector 140 and the substrate 110, but details of the connection will be omitted here.

For the pitches of the gratings, the following relationship is established.

$$p1=p3=2\times p2$$

The optical distances z1 and z2 between each grating are calculated by using expression 14 and expression 15. Among the components of Δz in expression 4, the design value of Δz0 is 0, and only Δzd in the diagram exists. Δzd is not a geometrical difference between the first grating 131 and the PD array 141, but is a difference between z1 and z2, which are the optical distances.

The shape of the first grating 131 and the shape of each individual grating group of the PD array 141 are shown in FIG. 12A and FIG. 12B. W1 and W3 are related by the relationship W1<W3. In the second embodiment, p2, z1, z2, n, W1, and W3 are set such that the relationship in expression 16 shown in the first embodiment is established. Consequently, the relationship in expression 18 is also established simultaneously.

Here, the effective width of the first grating 131 and the effective width of the PD array 141 will be described. Both indicate a width contributing to the signal detection of the optical encoder.

The effective light emission width of a light source has a great influence over the effective width of the first grating 131. In the structure of a normal optical encoder, often, the optical distance from the light source up to the first grating 131 is sufficiently smaller as compared to the optical distance from the light source up to the PD array 141 via the first grating 131 and the second grating 171.

Judging from the width of light emerged from the light emitting section, up to the light receiving section, in this case, the effective width of the first grating 131 roughly matches with the effective width of the light source. Moreover, when the optical distance from the light source up to the first grating 131 cannot be ignored, it is necessary to determine the effective width of the first grating 131 according to a ratio of the optical distance from the light source up to the first grating 131 to the optical distance from the light source up to the PD array 141 via the first grating 131 and the second grating 171, and the effective width of the PD array 141.

The effective width of the PD array 141 is required to be determined according to the effective width of the self-image of the second scale which is magnified on the PD array 141, and the detection width of the PD array 141. For a broad light such as light from a normal LED chip, the detection width of the PD array 141 may be let to be the effective width of the PD array 141. Conversely, in the case of a laser light source with a narrow beam width, and a light source in which the beam width is suppressed by a lens, the effective width of the self-image may be let to be the effective width of the PD array 141.

It may be sufficient to confirm that the effective widths satisfy expression 16 and expression 18. Consequently, when accurate values of the widths cannot be obtained, expression 16 and expression 18 may be let to be satisfied by using a round number equal to or greater than the actual values of the effective width.

For each component of the second embodiment, various modifications and substitutions are possible. An example of a bare LED was shown for the light source. However, the light source may be a surface emitting laser etc., which is capable of forming a diffraction image.

Glass is common as a material of the light transmission member 130 having the first grating 131, but a resin such as PET and polyimide may also be used. An example in which, four phase groups having different detection phases are put in one place in the PD array 141 is shown, but two or four PD array groups may be also be used.

The structure of the second embodiment is a structure which detects an amount of relative movement. However, it is also possible to dispose additional members for detecting the reference position, particularly, a light source, a detecting section, and an optical pattern etc.

Furthermore, by disposing the first grating 131 and the second grating 171, and the PD array 141 or some of these three in plurality, it is possible to make a structure in which the displacement in the same direction is detected by a plurality of detecting systems, or the displacement in the plurality of directions which are orthogonal are detected simultaneously.

Light is emerged from the bare LED 120 which is a light source, and this light is irradiated to the second diffraction grating 171 on the scale 170, after passing through the first grating 131 formed on the light transmission substrate 130. Further, the light is reflected and diffracted at the second grating 171, and a diffraction image of the second grating 171 is formed on the PD array 141 formed on the light transmission substrate 150, and detected.

This diffraction image is an image in which the second grating 171 is magnified to double size. When the scale 170 moves relatively in the x direction with respect to the detecting head, this diffraction image moves in the x direction on the PD array 141. Therefore, a periodic quasi sine wave signal is obtained from the photodetector 140.

Four signals having a phase difference of 90° are obtained from the photodetector 140. It is possible to achieve two signals having a phase difference of 90° by taking the differences of two pairs of signals having a phase difference of 180°, if necessary. In this case, expression 20 and expression 21 shown in the first embodiment hold true.

From this, it is revealed that in expression 12 and expression 13, the absolute value of (z1−z2) which satisfies the abovementioned expressions is smaller than the absolute value of $\Delta z_d$ when the signal amplitude of the optical encoder becomes 0 for the first time after the absolute value of $\Delta z_d$, which is (z1−z2), starts from 0 and goes on becoming greater than 0 gradually.

Consequently, it is revealed that by the shift in the magnification due to shift of $\Delta z_d$ from 0, the number of cycles of the self-image of the scale per the effective width w3 on the PD array 141 will not be shifted by even 1 cycle.

Similarly, it is also revealed that by the shift in the magnification due to shift of $\Delta z_d$ from 0, the self-images of the scale, which are formed by light emerged from between the grating grids, namely the grating windows, of the first grating cannot cancel out when superposed.

Since the parameters are designed in the range in which the amplitude of the optical encoder signal does not become 0, it is possible to obtain assuredly the optical encoder signal, irrespective of the manufacturing dispersion namely a change in $\Delta z_d$. Particularly, when the value of p2 which determines the resolution and accuracy is fixed, by reducing the values of the effective widths W1 and W3, it is possible to have a large tolerance of $\Delta z_d$, which is a mounting dispersion, and the manufacturing becomes easy, and the yield is improved.

On the other hand, with the substrate 110 as a common substrate, the bare LED 120, the light transmission substrate 130 having the first grating 131, and the photodetector 140 having the PD array 141 are stuck directly on the substrate 110.

These members are of bare chip type having a small thickness tolerance, and a parallel flat shape, and only the thickness tolerance of the bare LED 120 and the photodetector 140, and the dispersion in thickness of the joining portion affect the mounting tolerance of Δzd. Normally, the thickness tolerance of a bare chip component is about ±20 μm at the most, and the structure is such that it is capable of suppressing the mounting tolerance to be small. Therefore, it is possible to have large effective widths W1 and W3 and have large encoder signals, and the SN ratio can be improved.

By providing the condition shown in expression 16, it is possible to satisfy two conditions of expression 20 to expression 23 with one expression. Besides, the left-hand side (W1+W3) is expressed by the sum of two variables, and it is easy to apply.

When the condition shown in expression 18 is provided instead of the condition shown in expression 16, it is possible to satisfy similarly two conditions in expression 20 and expression 21 with one expression. Besides, the left-hand side is a value close to W1 or W3 as compared to (W1+W3), and close to conditions in expression 20 and expression 21, in other words, it is possible to have a wider range as a solution, while satisfying the condition.

In the second embodiment, W1<W3, and when W1<<W3 with the light source being extremely small, only expression 21 is to be satisfied, but when W1>W2, in other words, even in the case where the light receiving section is smaller as compared to the light emitting section, by satisfying expression 16 or expression 18, the effect of the second embodiment can be expected.

Moreover, since the first grating 131 is disposed to be on the lower side of the light transmission substrate 130, which is the bare LED 120 side, the thickness tolerance of the light transmission substrate 130 does not have an effect on the mounting tolerance of Δzd, and therefore, it is possible to suppress the mounting tolerance of Δzd to be even smaller.

By attaching sticking the light transmission substrate 130 directly on the light emerging portion on the upper surface of the bare LED 120 which is a light source, and further carrying out wiring for conducting electricity to the portion on the upper surface of the bare LED 120, where the light transmission substrate 130 is not stuck, the function of the first grating 131 and the function of applying the electric current to the bare LED 120 are realized with a compact structure.

By using bare chip components in the light source and the light receiving section, it is possible to reduce the mounting area and thickness. Further, by using the bare LED 120, it is possible to reduce the length of the light emerging portion of the light emitting section to about few tens of μm to few hundreds of μm, and it is also possible to reduce the area of the light transmission substrate 130 which is disposed thereon. Therefore, it is advantageous for the size reduction and thinning.

By bringing the first grating 131 to be in a close contact with the small light emitting section of the bare LED 120, it is possible to suppress the number of the first gratings 131 required, to be the minimum. Accordingly, it is possible to reduce the length of W1, and to have a large mounting tolerance of Δzd, or there is a merit that deterioration of the signal amplitude of the optical encoder can be suppressed to be small even with the same mounting tolerance of Δzd.

Moreover, in the resin molding by size reduction and thinning, an improvement in the reliability such as eliminating cracks and wire break can be expected. Further, since it is molded by resin, atmospheric pressure does not have the effect on the encoder easily, and it is possible to use in vacuum or under high pressure.

In the light transmission substrate 130, the first grating 131 is patterned on the central portion of the surface on one side of the light transmission substrate 130, and the surrounding portion of the surface is let to be the light shielding portion, thereby not allowing the light to pass through. Therefore, it plays a role of suppressing an increase in a noise component due to entering of excess light in the light receiving section, while securing the effective width W1 of the first grating 131 as designed. Accordingly, it is possible to increase the mounting tolerance of Δzd, and to suppress deterioration of the signals due to Δzd, as well as to improve the SN ratio by shielding the unnecessary light.

By integrating the photodetector 140 and the light transmission substrate 150 having the third grating 151 in the first embodiment, into the PD array 141, the number of members is decreased, and the mounting becomes easy. Moreover, manufacturing accuracy of the PD array which is manufactured by a semiconductor process is much better than mounting accuracy of the third grating 151, and the deterioration of the signals is suppressed.

Moreover, there was a difficulty when a light transmission member having the third grating 151 was used, by using the PD array, it becomes easy to put together the four phase groups at one place, and a smaller area is required for the light receiving surface. Therefore, as compared to a case in which the light receiving section is divided at four locations, The effect of a rotation shift on phase shifts of the encoder signals is much smaller. Accordingly, with respect to the rotation shift, mounting and installation tolerances are improved. Moreover, since the small area is required for the light receiving surface, more compact structure is possible.

Modified Embodiment

Figure 6:
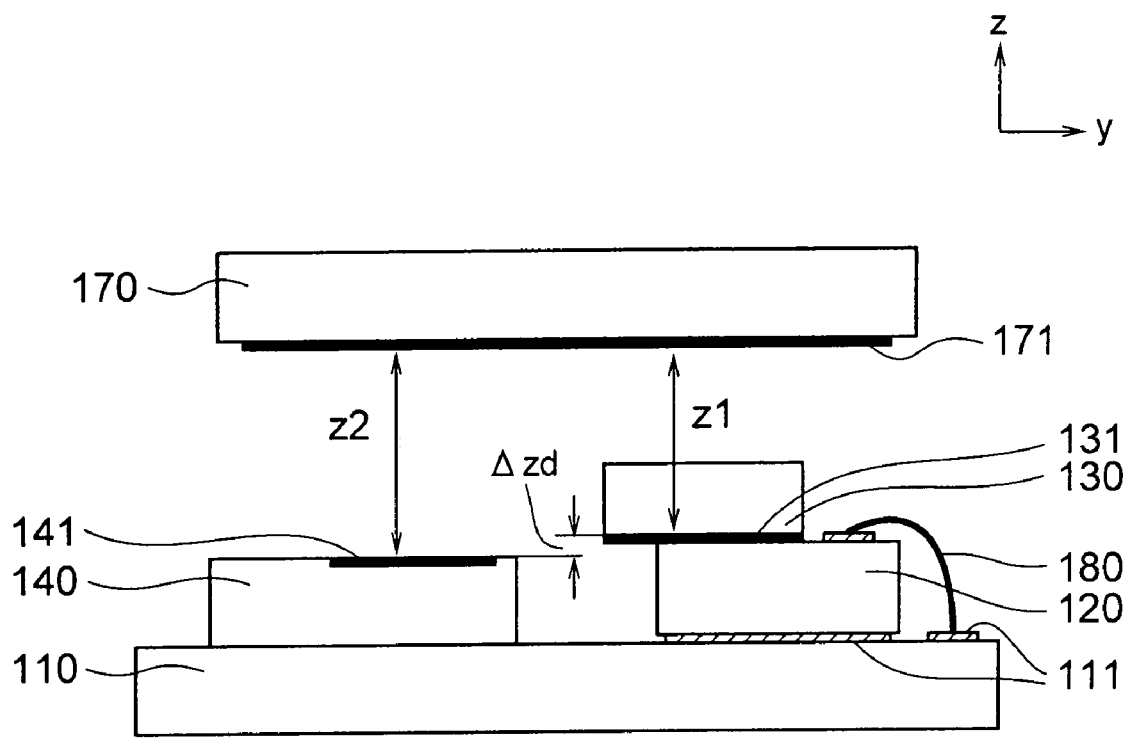
FIG. 6 is diagram showing a cross-sectional view of an optical encoder according to a modified embodiment of the second embodiment.

A modified embodiment of the second embodiment of the present invention is shown in FIG. 6. FIG. 6 is a cross-sectional view. As shown in the diagram, the coordinate system of x y z is set.

This modified embodiment is an embodiment in which the light transmitting resin 160 is excluded from the second embodiment. From the aspect of physical and electrical reliability, portion, only the wiring portion may be protected by resin potting etc. Moreover, the entire head section may be put in a case made of ceramic etc., and may be sealed with a lid.

In this modified embodiment, similarly as in the first embodiment, p2, z1, z2, n, W1, and W3 are set such that expression 16 to expression 18 are satisfied. However, in this case, the refractive indices n corresponding to resin, are all replaced by n=1. The thickness of each member is to be set such that z1 and z2 which are calculated by applying expression 14 and expression 15 to the embodiment of the present invention become almost equal.

(Effect)

Basically, the functions of the members of this embodiment are the same as those of the second embodiment, and the relationships in expression 20 and expression 21 hold true.

In this modified embodiment, similar effects as in the second embodiment are achieved. An effect peculiar to this modified embodiment is that the use and preservation at a temperature higher than or equal to an upper temperature limit of the resin become possible since the encoder head is not molded by resin. Moreover, since the head size is small, and the members and the manufacturing process are simplified, the cost can be also reduced.

Figure 7:
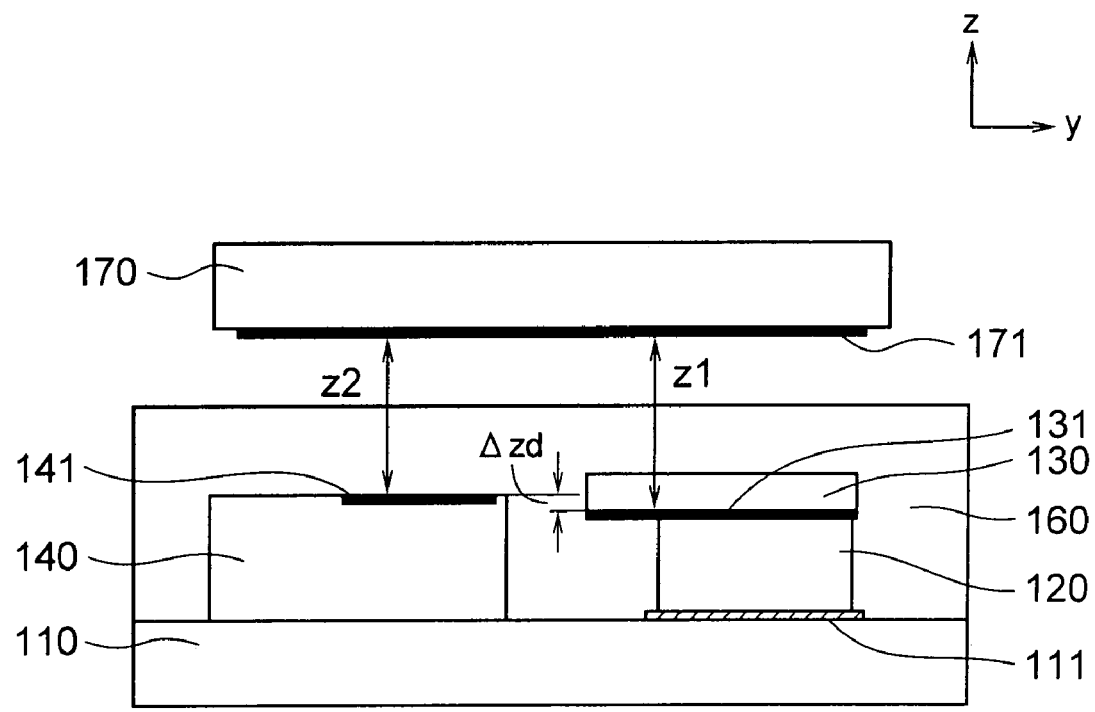
FIG. 7 is a diagram showing cross-sectional view of an optical encoder according to another modified embodiment of the second embodiment.

Next, another modified embodiment will be described below. A cross-sectional view of a structure in which the light source is replaced by a molded LED 120 of chip type for surface mounting instead of the bare LED, is shown in FIG. 7. Two electrodes to conduct an electric current are formed on the lower surface of this molded LED 120. Moreover, the upper surface is almost flat and is parallel to the lower surface. The thickness tolerance of this molded LED 120 is not more than ±0.05 mm.

In this manner, by using the molded LED 120, the wiring on the LED upper surface is not required to be carried out, and it becomes easy to mount the light transmission substrate 130 having the first grating 131. Further, since the molded LED 120 is sealed, it has a higher versatility and reliability as compared to the bare LED. Therefore, there is a merit that the packaging of the optical encoder becomes easy.

Moreover, in the first embodiment and the second embodiment, it may be structured such that, the first grating 131 of the light transmission substrate 130 is formed on a scale side, and z1 and z2 are almost matching. According to this structure, since the first grating 131 is on the upper side which is the scale side, when the thickness from the first grating 131 up to a resin surface is constant, a resin thickness becomes thicker as compared to when the first grating 131 is on the lower side. Therefore, due to a difference in a coefficient of linear expansion of the light transmission substrate 130 and the resin, a flatness of the surface is improved at the time of hardening the resin by lowering the temperature from a high temperature to a low temperature, at the time of manufacturing, and as a result, optical characteristics are improved.

Furthermore, in the first embodiment and the second embodiment, it may be structured such that spacers in a form of a parallel flat plate may be inserted and stuck between the common substrate 110 and the photodetector 140, or between the common substrate 110 and the bare LED 120, or between the common substrate 110 and the photodetector 140 as well as between the common substrate 110 and the bare LED 120, and z1 and z2 are almost matched.

By using spacers in such a manner, in aligning the heights of the first grating 131 and the third grating 151 or the PD array, an adjustment of the thickness of the bare LED 120, the light transmission substrate 130, and the photodetector 140 becomes possible substantially.

Concretely, since the thickness of each member is determined in advance, it is effective when it is not possible to align the height of the first grating 131 and the third grating 151 or the PD array without any spacer. Moreover, when the thickness of a member is varied extremely, or at the time of replacing a member by another member, there is a merit that the adjustment is possible by changing the thickness of the spacer. Furthermore, by using a spacer having a small thickness tolerance, it is possible to suppress an effect on Δzd, which is a difference between z1 and z2, to be as small as possible.

Third Embodiment

Figure 8:
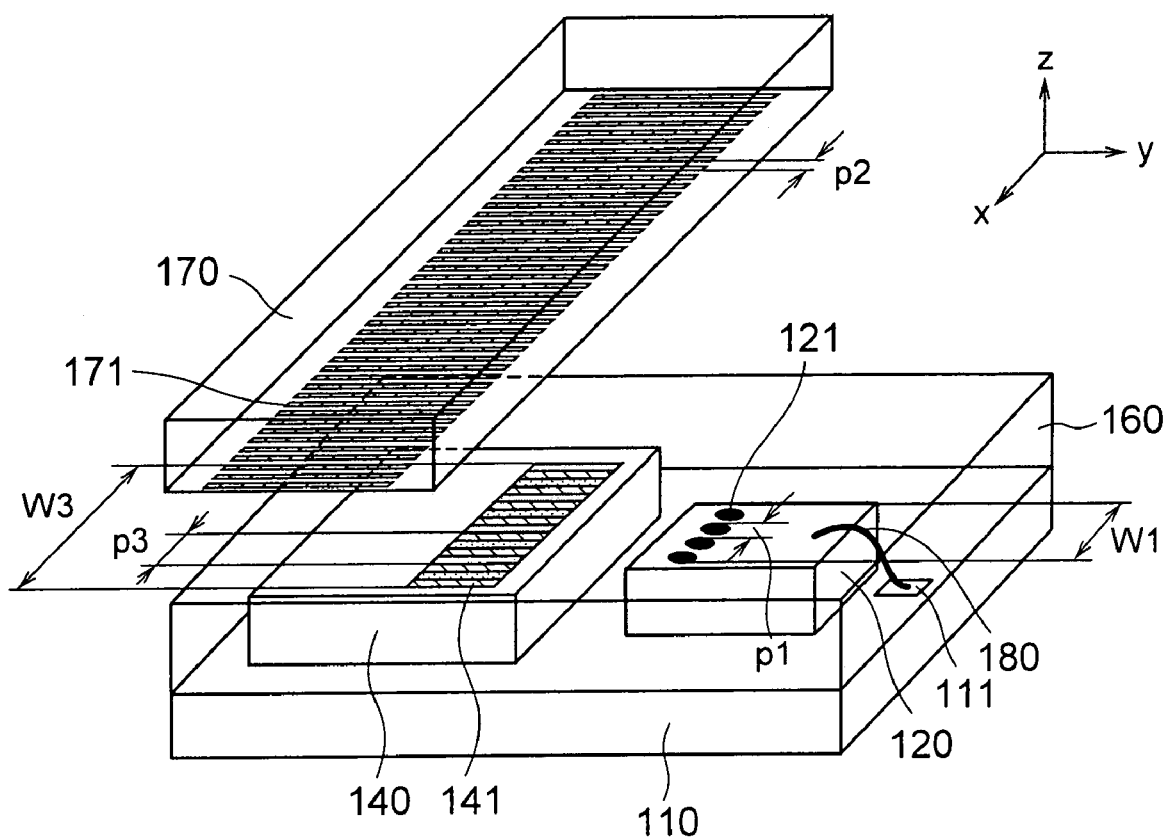
FIG. 8 is a diagram showing a cross-sectional view of an optical encoder according to a third embodiment of the present invention.
Figure 9:
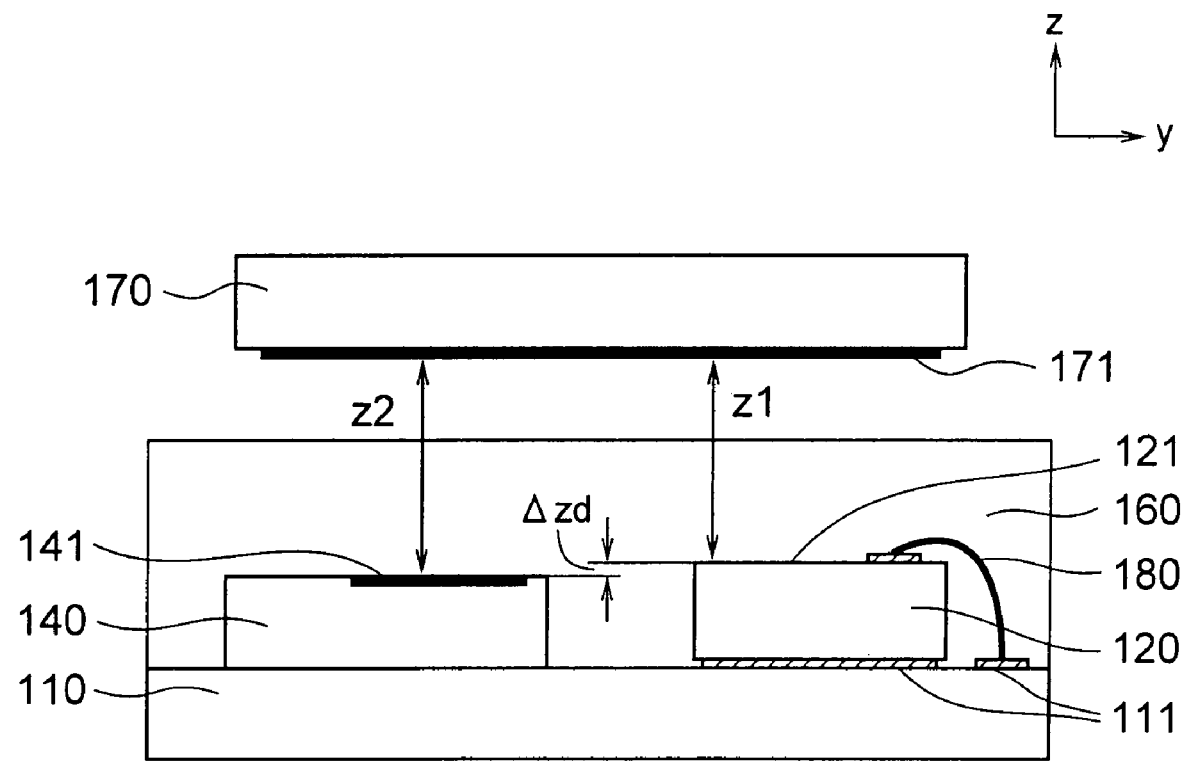
FIG. 9 is a diagram showing a cross-sectional view of the optical encoder according to the third embodiment.
Figure 10:
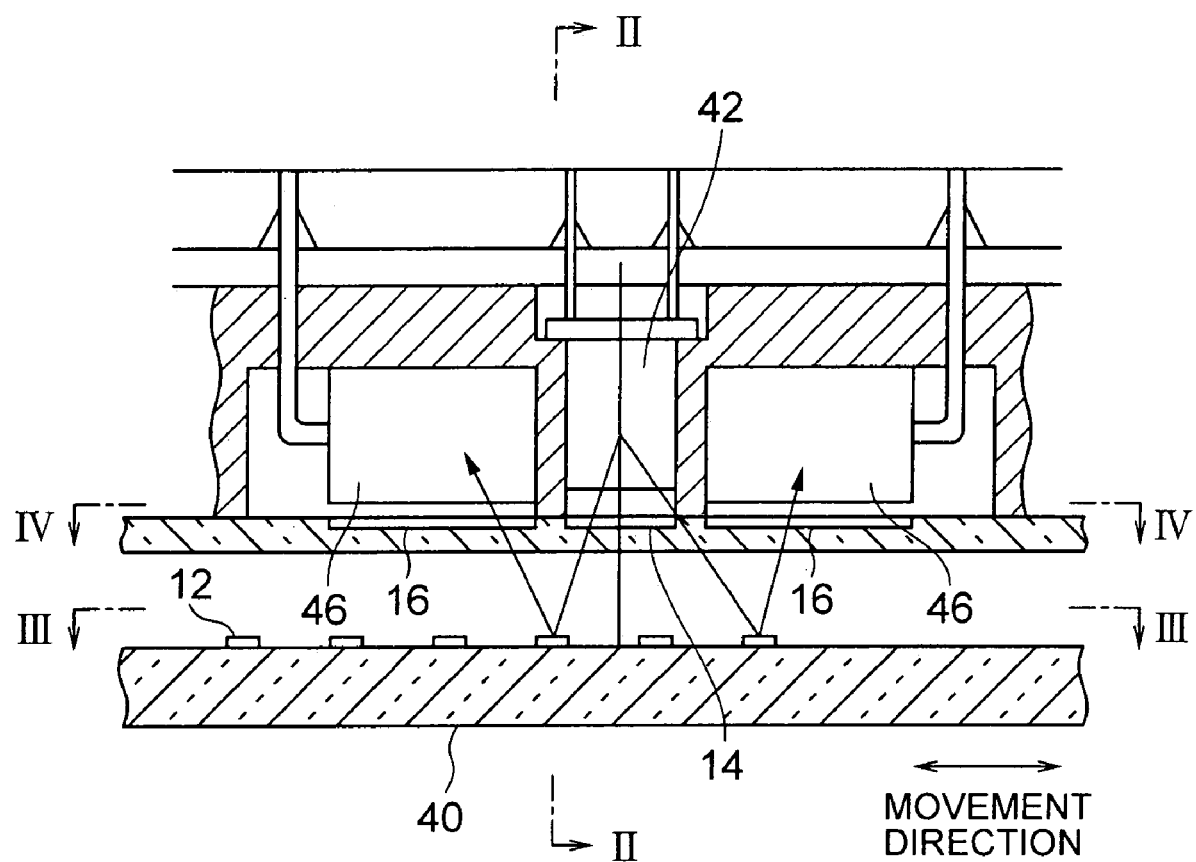
FIG. 10 is a diagram showing a cross-sectional view of an optical encoder of a conventional technology.
Figure 11:
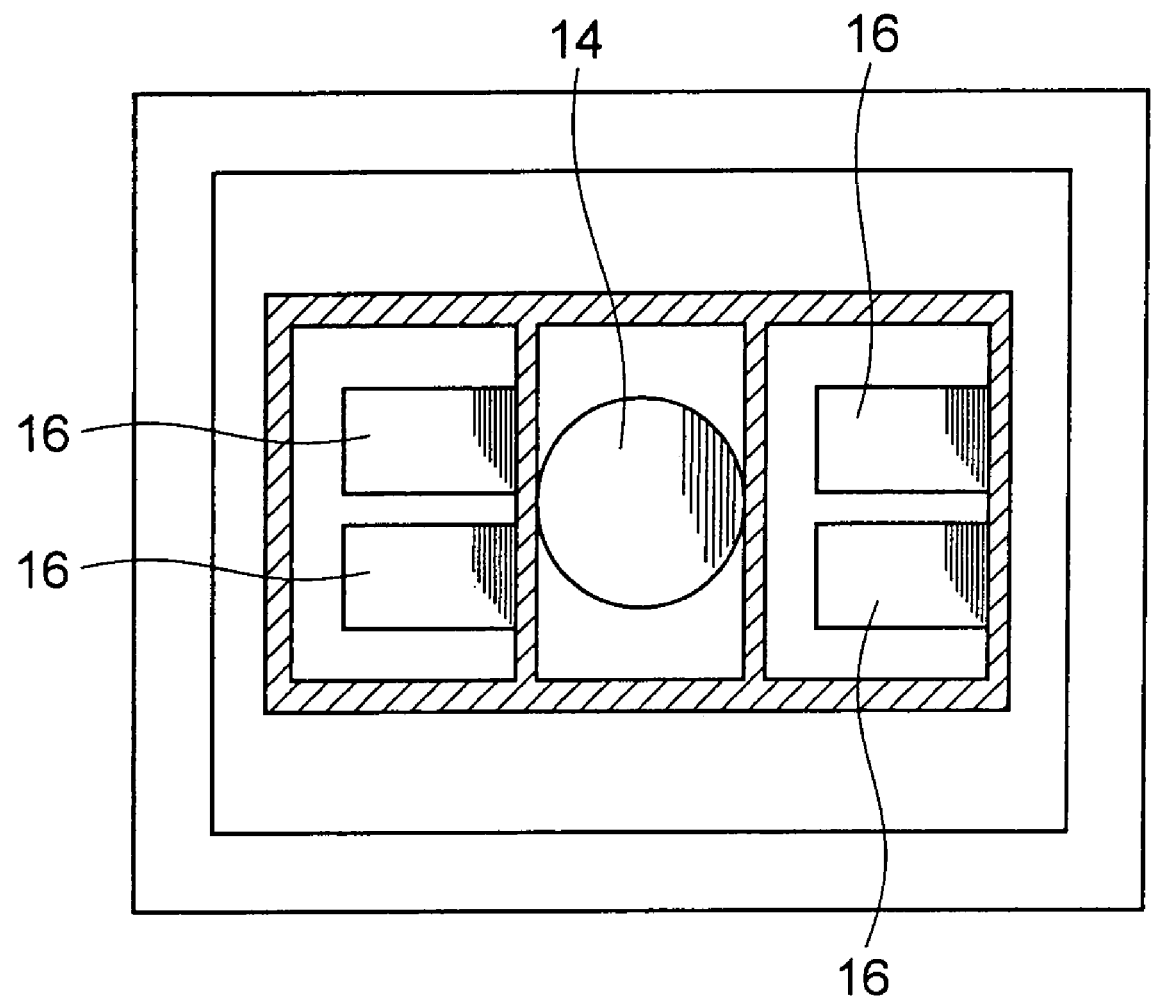
FIG. 11 is a diagram showing a top view of the optical encoder of the conventional technology.

Next, a third embodiment of the present invention will be described below. FIG. 8 and FIG. 9 show a structure of the third embodiment. FIG. 8 is a perspective view and FIG. 9 is a cross-sectional view. As shown in the diagram, the coordinate system x y z is set.

The third embodiment is an embodiment in which, in the second embodiment, the light source is let to be a light source 120 having an array 121 of light emitting windows in a form of spots with the effective width W1 and the first pitch p1. The light emitting array section in the form of spots also serves as the first grating 131. A bare chip LED or a surface emitting laser can be used for the light source.

Moreover, when it is difficult to dispose in a row the light emitting windows in the form of spots, the light emitting windows may be arranged in two or more rows while maintaining the pitch in the direction of scale movement. W1 is let to be W1<p3. The remaining structure is same as in the second embodiment.

(Effect)

The functions of the members of the third embodiment is basically the same as those of the second embodiment.

Moreover, in the third embodiment, an effect similar as in the second embodiment is achieved. Further, since the light transmission substrate 130 becomes unnecessary, the structure becomes simple, and since there is no interference of the light transmission substrate 130 at the time of mounting the electroconductive wire 180, the mounting becomes easy.

Moreover, since there is no light transmission substrate at all, it becomes easy to secure the flatness of the resin upper surface, and an improvement in a quality of the optical encoder signals is facilitated. Further, it is possible to secure an amount of light by disposing a plurality of light sources, and this embodiment has an effect of compensating disperation in the amount of light from the emitting windows, and a reliability of light from the light emitting section.

The present invention can have various modified embodiments which fairly fall within the basic teachings herein set forth.

As it has been described above, the optical encoder according to the present invention, in particular, is useful as a triple slit optical encoder.

According to the present invention, there is shown an effect that it is possible to provide an optical encoder having a stable performance, a high reliability, a small size, a low cost, and suitable for mass production.

What is claimed is:

1. An optical encoder comprising:

a light source;

a photodetector;

a scale which is relatively displaceable with respect to the light source and the photodetector;

a first grating which is interposed between the light source and the scale, and on which, an optical pattern of a first pitch p1 is formed in a direction of relative displacement of the scale;

a second grating which is provided on the scale, and on which, an optical pattern of a second pitch p2 is formed in the direction of relative displacement of the scale; and a third grating which is interposed between the scale and the photodetector, and on which, an optical pattern of a third pitch p3 is formed in the direction of relative displacement of the scale, wherein light emerged from the light source travels via the first grating and the second grating, and forms an image on the third grating as a magnified scale-image pattern in which the optical pattern formed on the second grating is magnified at a predetermined magnification, and a periodic signal according to an amount of relative displacement of the scale is detected, and the first grating and the third grating are formed on separate members, and values of a first effective width W1 and the first pitch p1 of the optical pattern on the first grating, and a third effective width W3 and the third pitch p3 of the optical pattern on the third grating are set to values such that the periodic signal having amplitude effective for detection of the relative displacement of the scale is achieved based on periodicity of the magnified scale-image pattern, refractive indices of substances and/or spaces interposed in the optical path from the light source up to the photodetector, and the thickness of those substances and/or spaces in a direction substantially perpendicular to the plane on which the second grating is formed.

2. The optical encoder according to claim 1, wherein amplitude of the signal derived from the superposed magnified scale-image pattern formed on the third grating by all the individual grating windows of the first grating is reinforced due to the pitches of the first grating, the second grating, and the third grating, and in a range of the third effective width W3 of the third grating, the signal strength of the magnified scale-image pattern formed on the third grating is reinforced due to the pitches of the self-image and the third grating.

3. An optical encoder comprising:

a light source;

a photodetector;

a scale which is relatively displaceable with respect to the light source and the photodetector;

a first grating which is interposed between the light source and the scale, and on which, an optical pattern of a first pitch p1 is formed in a direction of relative displacement of the scale;

a second grating which is provided on the scale, and on which, an optical pattern of a second pitch p2 is formed in the direction of relative displacement of the scale; and a third grating which is interposed between the scale and the photodetector, and on which, an optical pattern of a third pitch p3 is formed in the direction of relative displacement of the scale, wherein light emerged from the light source travels via the first grating and the second grating, and forms an image on the third grating as a magnified scale-image pattern in which the optical pattern formed on the second grating is magnified at a predetermined magnification, and a periodic signal according to an amount of relative displacement of the scale is detected, and the first grating and the third grating are formed on separate members, and values of a first effective width W1 and the first pitch p1 of the optical pattern on the first grating, and a third effective width W3 and the third pitch p3 of the optical pattern on the third grating are set to values such that the periodic signal having amplitude effective for detection of the relative displacement of the scale is achieved based on periodicity of the magnified scale-image pattern, refractive indices of substances and/or spaces interposed in the optical path from the light source up to the photodetector, and the thickness of those substances and/or spaces in a direction substantially perpendicular to the plane on which the second grating is formed, and wherein when a and b are let to be integer numbers not less than 1, and the effective number of cycles of the first grating is let to be a value obtained by dividing the first effective width W1 by the first pitch p1, the absolute value of the difference between the effective number of cycles of the first grating, and the number of cycles of the magnified scale-image pattern per first effective width W1 on the third grating is less than 1 cycle, or within the limit whose center is (a+0.5) cycles and whose range is less than 0.5 cycle, and the absolute value of the difference between the number of cycles of the third grating per the third effective width W3, and the number of cycles of the magnified scale-image pattern per the third effective width W3 on the third grating is less than 1 cycle, or within the limit whose center is (b+0.5) cycles and whose range is less than 0.5 cycle.

4. The optical encoder according to claim 3, wherein the absolute value of the difference between the effective number of cycles W1/p1 of the first grating, and the number of cycles of the self-image per first effective width W1 on the third grating is less than 1 cycle, and the absolute value of the difference between the number of cycles of the third grating per the third effective width W3, and the number of cycles of the magnified scale-image pattern per the third effective width W3 on the third grating is less than 1 cycle.

5. The optical encoder according to claim 4, wherein when the refractive index of an i-th substance or space, where i is a natural number, between the first grating and the second grating is let to be ni, and the thickness thereof is let to be ti, the refractive index of j-th substance or space, where j is a natural number, between the second grating and the third grating is let to be nj, and the thickness thereof is let to be tj, the optical distance between the first grating and the second grating is let to be $z1=\Sigma ti/ni$, and the optical distance between the second grating and the third grating is defined as $z2=\Sigma tj/nj$, then $p1=p3=2 \cdot p2$, and $z1 \cong z2$, and the first effective width W1 of the first grating and the third effective width W3 of the third grating satisfy the following expression $$\sqrt{W1^2 + W3^2} < 2 \cdot p2 \cdot \frac{(z1+z2)}{|z1-z2|}.$$

6. The optical encoder according to claim 4, wherein when the refractive index of i-th substance or space, where i is a natural number, between the first grating and the second grating is let to be ni, and the thickness thereof is let to be ti, the refractive index of j-th substance or space, where j is a natural number, between the second grating and the third grating is let to be nj, and the thickness thereof is let to be tj, the optical distance between the first grating and the second grating is let to be $z1=\Sigma ti/ni$, and the optical distance between the second grating and the third grating is defined as $z2=\Sigma tj/nj$, then $p1=p3=2 \cdot p2$, and $z1 \cong z2$, and the first effective width W1 of the first grating and the third effective W3 of the third grating satisfy the following expression $$(W1 + W3) < 2 \cdot p2 \cdot \frac{(z1+z2)}{|z1-z2|}.$$

7. The optical encoder according to claim 3, wherein when the refractive index of i-th substance or space, where i is a natural number, between the first grating and the second grating is let to be ni, and the thickness thereof is let to be ti, the refractive index of j-th substance or space, where j is a natural number, between the second grating and the third grating is let to be nj, and the thickness thereof is let to be tj, the optical distance between the first grating and the second grating is let to be $z1=\Sigma ti/ni$, and the optical distance between the second grating and the third grating is defined as $z2=\Sigma tj/nj$, then $p1=p3=2 \cdot p2$, and $z1 \cong z2$, and when a is let to be a natural number not smaller than 1, the value of the first effective width W1 of the first grating satisfies one of the following two expressions $$W1 < 2 \cdot p2 \cdot \frac{(z1+z2)}{|z1-z2|}$$

-continued
$$2 \cdot a \cdot p2 \cdot \frac{(z1+z2)}{|z1-z2|} < W1 < 2 \cdot (a+1) \cdot p2 \cdot \frac{(z1+z2)}{|z1-z2|}.$$

8. The optical encoder according to claim 3, wherein
when the refractive index of i-th substance or space, where i is a natural number, between the first grating and the second grating is let to be ni, and the thickness thereof is let to be ti, the refractive index of j-th substance or space, where i is a natural number, between the second grating and the third grating is let to be nj, and the thickness thereof is let to be tj, the optical distance between the first grating and the second grating is let to be z1=Σti/ni, and the optical distance between the second grating and the third grating is defined as z2=Σtj/nj,
then, p1=p3=2·p2, and z1≅z2, and
when b is let to be a natural number not smaller than 1, the value of the third effective width of the third grating satisfies one of the following two expressions $$W3 < 2 \cdot p2 \cdot \frac{(z1+z2)}{|z1-z2|}$$

$$2 \cdot b \cdot p2 \cdot \frac{(z1+z2)}{|z1-z2|} < W3 < 2 \cdot (b+1) \cdot p2 \cdot \frac{(z1+z2)}{|z1-z2|}.$$

9. The optical encoder according to claim 3, wherein the light source and the first grating are formed by a light source array.

10. The optical encoder according to claim 3, wherein a light transmission member having a first grating pattern area on one of an entire surface and a part thereof, is mounted on the light source.

11. The optical encoder according to claim 10, wherein one of a portion of the light transmission member other than the first grating pattern area and a part thereof has a light shielding function.

12. The optical encoder according to claim 10, wherein the first grating pattern is formed on a surface on a side of a light emitting section.

13. An optical encoder comprising:
a light source;
a scale which is relatively displaceable with respect to the light source and a photodetector;
a first grating which is interposed between the light source and the scale, and on which, an optical pattern of a first pitch p1 is formed in a direction of relative displacement of the scale;
a second grating which is provided on the scale, and on which, an optical pattern of a second pitch p2 is formed in the direction of relative displacement of the scale; and
an array photodetector in which a plurality of photodetectors are formed at a third pitch p3, in the direction of relative displacement of the scale, wherein
light emerged from the light source travels via the first grating and the second grating, and forms an image on the array photodetector, as a magnified scale-image pattern in which the optical pattern formed on the second grating is magnified at a predetermined magnification, and a periodic signal according to an amount of relative displacement of the scale is detected, and
the first grating and the array photodetector are formed on separate members, and
values of a first effective width W1 and the first pitch p1 of the optical pattern on the first grating, and a third effective width W3 and the third pitch p3 of the photodetectors which forms the array photodetector are set to values such that the periodic signal having amplitude effective for detection of the relative displacement of the scale is achieved based on periodicity of the magnified scale-image pattern, a refractive indices of substances and/or spaces interposed in the optical path from the light source up to the array photodetector, and the thickness of those substances and/or spaces in a direction substantially perpendicular to the plane on which the photodetectors are formed.

14. The optical encoder according to claim 13, wherein amplitude of the signal derived from the superposed magnified scale-image pattern formed on the array photodetector by all the individual grating windows of the first grating is reinforced due to the pitches of the first grating, the second grating, and the array photodetector, and in a range of the third effective width W3 of the array photodetector, the signal strength of the magnified scale-image pattern is reinforced due to the pitch of the magnified scale-image pattern and the pitch p3 of the array photodetector.

15. An optical encoder comprising:
a light source;
a scale which is relatively displaceable with respect to the light source and a photodetector;
a first grating which is interposed between the light source and the scale, and on which, an optical pattern of a first pitch p1 is formed in a direction of relative displacement of the scale;
a second grating which is provided on the scale, and on which, an optical pattern of a second pitch p2 is formed in the direction of relative displacement of the scale; and
an array photodetector in which a plurality of photodetectors are formed at a third pitch p3, in the direction of relative displacement of the scale, wherein
light emerged from the light source travels via the first grating and the second grating, and forms an image on the array photodetector, as a magnified scale-image pattern in which the optical pattern formed on the second grating is magnified at a predetermined magnification, and a periodic signal according to an amount of relative displacement of the scale is detected, and
the first grating and the array photodetector are formed on separate members, and
values of a first effective width W1 and the first pitch p1 of the optical pattern on the first grating, and a third effective width W3 and the third pitch p3 of the photodetectors which forms the array photodetector are set to values such that the periodic signal having amplitude effective for detection of the relative displacement of the scale is achieved based on periodicity of the magnified scale-image pattern, a refractive indices of substances and/or spaces interposed in the optical path from the light source up to the array photodetector, and the thickness of those substances and/or spaces in a direction substantially perpendicular to the plane on which the photodetectors are formed; and
wherein when a and be are let to be integer numbers not less than 1, and the effective number of cycles of the first grating is let to be a value obtained by dividing the first effective width W1 by the first pitch p1,
the absolute value of the difference between the effective number of cycles of the first grating, and the number of cycles of the magnified scale-image pattern per first effective width W1 on the array photodetector is less than 1 cycle, or within the limit whose center is (a+0.5) cycles and whose range is less than 0.5 cycle, and the absolute value of the difference between the number of cycles of the array photodetector per the third effective width W3, and the number of cycles of the magnified scale-image pattern per the third effective width W3 on the array photodetector is less than 1 cycle, or within the limit whose center is (b+0.5) cycles and whose range is less than 0.5 cycle.

16. The optical encoder according to claim 15, wherein the absolute value of the difference between the effective number of cycles W1/p1 of the first grating, and the number of cycles of the magnified scale-image pattern per first effective width W1 on the array photodetector is less than 1 cycle, and the absolute value of the difference between the number of cycles of the array photodetector per the effective width W3 of the array photodetector, and the number of cycles of the magnified scale-image pattern per the third effective width W3 on the array photodetector is less than 1 cycle.

17. The optical encoder according to claim 16, wherein when the refractive index of i-th substance or space, where i is a natural number, between the first grating and the second grating is let to be ni, and the thickness thereof is let to be ti, the refractive index of j-th, substance or space, where j is a natural number, between the second grating and the array photodetector is let to be nj, and the thickness thereof is let to be tj, the optical distance between the first grating and the second grating is let to be $z1=\Sigma ti/ni$, and the optical distance between the second grating and the array photodetector is defined as $z2=\Sigma tj/nj$, then, $p1=p3=2 \cdot p2$, and $z1 \cong z2$, and the first effective width W1 of the first grating and the third effective width W3 of the array photodetector satisfy the following expression $$\sqrt{W1^2 + W3^2} < 2 \cdot p2 \cdot \frac{(z1+z2)}{|z1-z2|}.$$

18. The optical encoder according to claim 16, wherein when the refractive index of i-th substance or space, where i is a natural number, between the first grating and the second grating is let to be ni, and the thickness thereof is let to be ti, the refractive index of j-th substance or space, where j is a natural number, between the second grating and the array photodetector is let to be nj, and the thickness thereof is let to be tj, the optical distance between the first grating and the second grating is let to be $z1=\Sigma ti/ni$, and the optical distance between the second grating and the array photodetector is defined as $z2=\Sigma tj/nj$, then $p1=p3=2 \cdot p2$, and $z1 \cong z2$, and the first effective width W1 of the first grating and the third effective width W3 of the array photodetector satisfy the following expression $$(W1+W3) < 2 \cdot p2 \cdot \frac{(z1+z2)}{|z1-z2|}.$$

19. The optical encoder according to claim 15, wherein when the refractive index of i-th substance or space, where i is a natural number, between the first grating and the second grating is let to be ni, and the thickness thereof is let to be ti, the refractive index of j-th substance or space, where j is a natural number, between the second grating and the array photodetector is let to be nj, and the thickness thereof is let to be tj, the optical distance between the first grating and the second grating is let to be $z1=\Sigma ti/ni$, and the optical distance between the second grating and the array photodetector is defined as $z2=\Sigma tj/nj$, then $p1=p3=2 \cdot p2$, and $z1 \cong z2$, and when a is let to be a natural number not smaller than 1, the value of the first effective width of the first grating satisfies one of the following expressions $$W1 < 2 \cdot p2 \cdot \frac{(z1+z2)}{|z1-z2|}$$

$$2 \cdot a \cdot p2 \cdot \frac{(z1+z2)}{|z1-z2|} < W1 < 2 \cdot (a+1) \cdot p2 \cdot \frac{(z1+z2)}{|z1-z2|}.$$

20. The optical encoder according to claim 15, wherein when the refractive index of i-th substance or space, where i is a natural number, between the first grating and the second grating is let to be ni, and the thickness thereof is let to be ti, an the refractive index of j-th substance or space, where j is a natural number, between the second grating and the array photodetector is let to be nj, and the thickness thereof is let to be tj, the optical distance between the first grating and the second grating is let to be $z1=\Sigma ti/ni$, and the optical distance between the second grating and the array photodetector is defined as $z2=\Sigma tj/nj$, then, $p1=p3=2 \cdot p2$, and $z1 \cong z2$, and when b is let to be a natural number not smaller than 1, the value of the third effective width of the array photodetector satisfies one of the following two expressions $$W1 < 2 \cdot p2 \cdot \frac{(z1+z2)}{|z1-z2|}$$

$$2 \cdot a \cdot p2 \cdot \frac{(z1+z2)}{|z1-z2|} < W1 < 2 \cdot (a+1) \cdot p2 \cdot \frac{(z1+z2)}{|z1-z2|}.$$

21. The optical encoder according to claim 15, wherein the light source and the first grating are formed by a light source array.

22. The optical encoder according to claim 15, wherein a light transmission member having a first grating pattern area on one of an entire surface and a part thereof, is mounted on the light source.

23. The optical encoder according to claim 22, wherein one of a portion of the light transmission member other than the first grating pattern area and a part thereof has a light shielding function.

24. The optical encoder according to claim 22, wherein the first grating pattern is formed on a surface on a side of a light emitting section.

* * * * *